(12) United States Patent
Hoen et al.

(10) Patent No.: US 6,668,674 B2
(45) Date of Patent: Dec. 30, 2003

(54) PIVOT-LESS WATT LINKAGE, PIVOT-LESS WATT LINKAGE-BASED SUSPENSION AND MICROMACHINED DEVICE INCORPORATING SAME

(75) Inventors: Storrs T. Hoen, Brisbane, CA (US); Jonah A. Harley, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 76 days.

(21) Appl. No.: 10/042,805

(22) Filed: Dec. 19, 2001

(65) Prior Publication Data
US 2003/0110877 A1 Jun. 19, 2003

(51) Int. Cl.[7] ................................. G05G 1/00
(52) U.S. Cl. ..................... 74/470; 74/108; 74/479.01
(58) Field of Search ..................... 74/103, 108, 517, 74/479.01, 469, 470, 520; 267/160; 310/309, 340 MM

(56) References Cited

U.S. PATENT DOCUMENTS

| | | | | |
|---|---|---|---|---|
| 3,633,434 A | * | 1/1972 | Hoffman | 74/470 |
| 5,649,454 A | * | 7/1997 | Midha et al. | 74/520 |
| 6,175,170 B1 | * | 1/2001 | Kota et al. | 310/40 MM |
| 6,454,385 B1 | * | 9/2002 | Anderson et al. | 347/28 |
| 6,557,436 B1 | * | 5/2003 | Hetrick et al. | 74/517 |

* cited by examiner

Primary Examiner—Jack Lavinder
Assistant Examiner—Melanie Torres
(74) Attorney, Agent, or Firm—Ian Hardcastle

(57) ABSTRACT

The pivot-less Watt linkage supports a first rigid element relative to a second rigid element and permits relative motion between the rigid elements. The pivot-less Watt linkage comprises an elongate, rigid, floating beam, an elongate first flexible beam, an elongate second flexible beam and a flexible member. The first flexible beam extends in a first direction from a first point on the floating beam to the first rigid element. The second flexible beam extends in a second direction, substantially opposite the first direction, from a second point on the floating beam to the first rigid element. The second point is spatially separated from the first point along the length of the floating beam. The flexible member extends in the first direction from a third point on the floating beam to the second rigid element. The third point is intermediate between the first point and the second point.

26 Claims, 9 Drawing Sheets

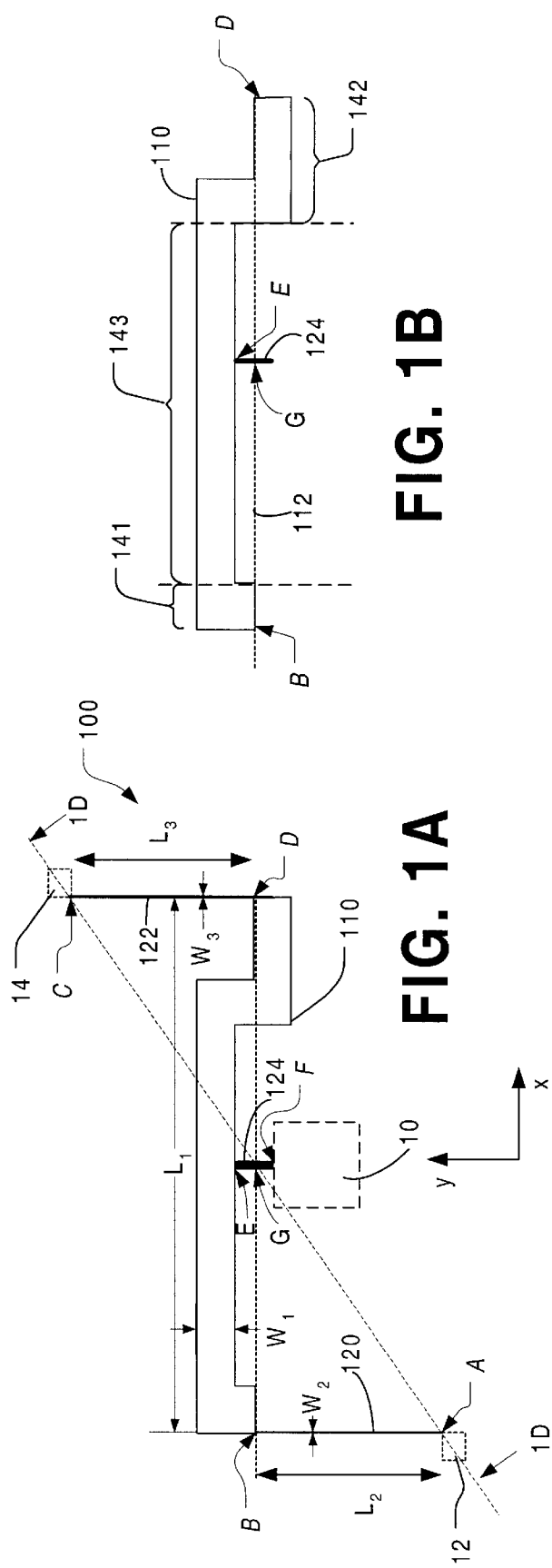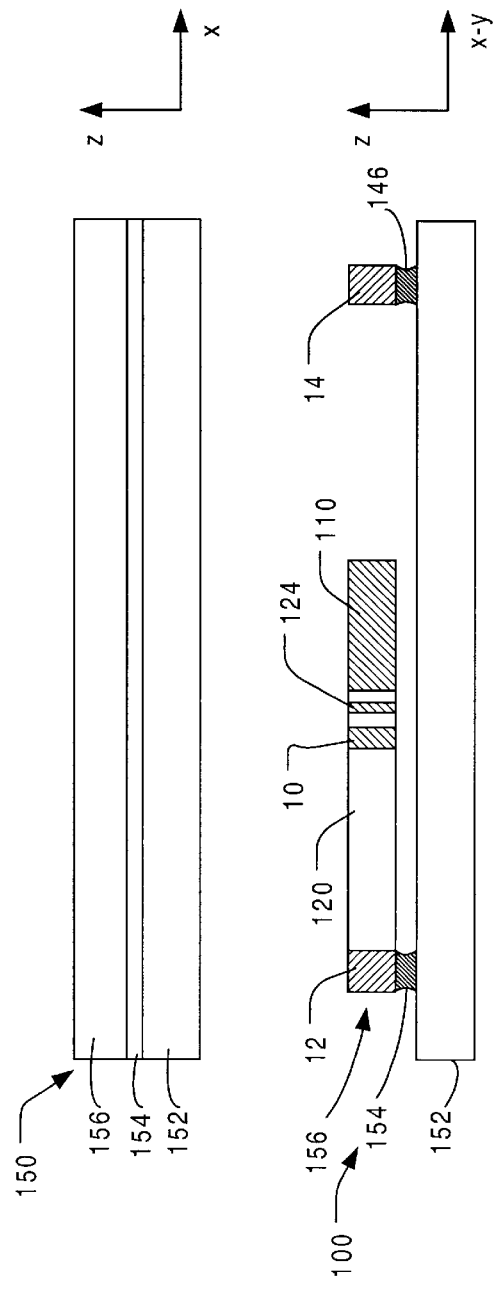

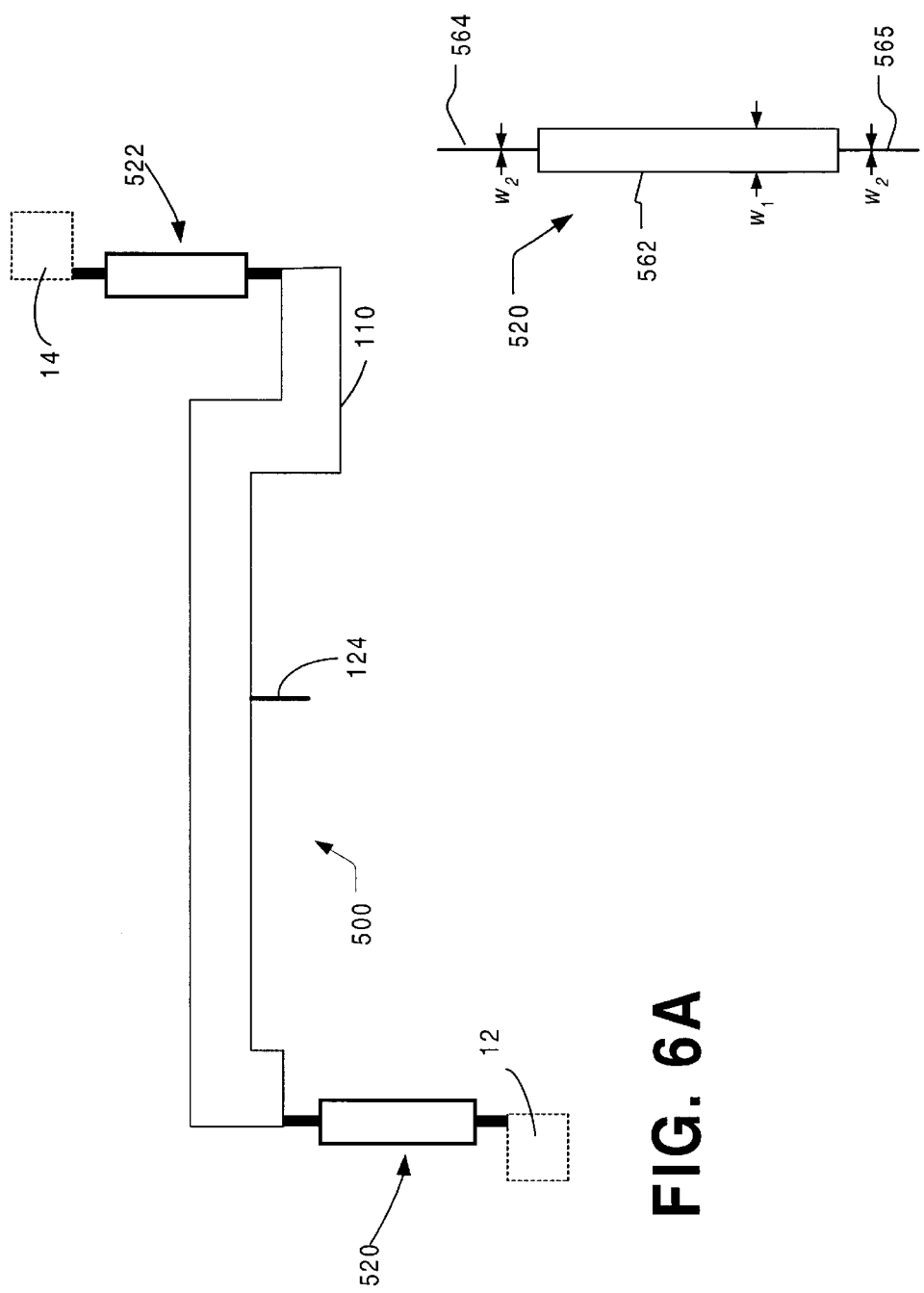

PIVOT-LESS WATT LINKAGE, PIVOT-LESS WATT LINKAGE-BASED SUSPENSION AND MICROMACHINED DEVICE INCORPORATING SAME

CROSS-REFERENCE TO RELATED APPLICATIONS

This application is related to the co-pending U.S. patent application Ser. No. 10/039,937 entitled Flexural Device-Based Suspension System Having High Compliance in a Direction of Travel and Low Compliance in a Direction Orthogonal Thereto, filed on same date as this disclosure, the entire disclosure of which is incorporated herein by reference.

BACKGROUND OF THE INVENTION

Micromachined devices include devices, such as actuators and motors, in which a movable element moves in a direction of motion with respect to another element. In some applications, the direction of motion is along a curved path, whereas in other applications the direction of motion is along a straight path. Such devices include a suspension that supports the movable element relative to the other element in a manner that allows the movable element to move freely in the direction of motion. Desirable properties of the suspension include that the suspension allow a broad range of movement in the direction of motion and that the suspension have a high compliance in the direction of motion. A suspension with a high compliance reduces the force that a motor needs to generate to move the movable element.

An electrostatic or electromagnetic motor used to move the movable element in the direction of motion not only generates a force in the direction of motion, but additionally generates parasitic forces with components in directions orthogonal to the direction of motion. More than minimal motion of the movable element in a direction orthogonal to the direction of motion is undesirable since it can result in physical contact between the movable element and the other element.

What is needed is a suspension for use in micromachined devices that has a high compliance in the direction of motion of the movable element, and that has a low compliance in at least one direction orthogonal to the direction of motion. The suspension should maintain a low compliance in the orthogonal direction over a substantial range of displacement of the movable element in the direction of motion. What is also needed is a suspension having a structure capable of easy fabrication using conventional micromachining techniques and that is reliable over many cycles of operation. Finally, what is needed is a suspension that can be configured to allow the movable element to move along either a straight path or a curved path.

SUMMARY OF THE INVENTION

The invention provides a pivot-less Watt linkage, a pivot-less Watt linkage-based suspension and a micromachined device. The pivot-less Watt linkage and the suspension incorporating the pivot-less Watt linkage has a high compliance in a direction of motion and a low compliance in at least one direction orthogonal to the direction of motion.

Specifically, the invention provides a pivot-less Watt linkage for supporting a first rigid element relative to a second rigid element to permit relative motion between the rigid elements. The pivot-less Watt linkage comprises an elongate, rigid, floating beam, an elongate first flexible beam, an elongate second flexible beam and a flexible member. The first flexible beam extends in a first direction from a first point on the floating beam to the first rigid element. The second flexible beam extends in a second direction, substantially opposite the first direction, from a second point on the floating beam to the first rigid element. The second point is spatially separated from the first point along the length of the floating beam. The flexible member extends in the first direction from a third point on the floating beam to the second rigid element. The third point is intermediate between the first point and the second point.

The motion is along a substantially straight path when the third point is substantially mid way between the first point and the second point. The motion is along a curved path when the third point is offset along the length of the floating beam from mid way between the first point and the second point, or when the flexible beams are of unequal length.

The flexible member may be a first flexible member, and the pivot-less Watt linkage may additionally comprise a second flexible member that extends in the second direction from a fourth point on the floating beam, opposite the third point, to the second rigid element.

The floating beam may have a compound structure including a first rigid beam section, a second rigid beam section, a third flexible beam and an additional flexible member. The first and second beam sections are each elongate. The first and third points are located in the first rigid beam section. The second point is located in the second rigid beam section. The third flexible beam extends from a fifth point on the first rigid beam section to a sixth point on the second rigid beam section. The fifth point is at a greater distance along the length of the first rigid beam section from the first point than the third point. The sixth point is spatially separated from the second point along the length of the second rigid beam section. The additional flexible member extends parallel to the second rigid beam section from a seventh point on the second beam section, remote from the second point, to the rigid element.

The floating beam, the flexible beams and the flexible member may be portions of a unitary structure. The unitary structure may constitute part of a single device layer. The pivot-less Watt linkage may include a major surface and the cross-sectional shape of the pivot-less Watt linkage in a plane parallel to the major surface may be independent of depth from the major surface.

The invention also provides a pivot-less Watt linkage-based suspension for supporting a first rigid element relative to a second rigid element to permit relative motion between the rigid elements. The suspension comprises pivot-less Watt linkages. Each pivot-less Watt linkage includes an elongate, rigid, floating beam, an elongate first flexible beam, an elongate second flexible beam and a flexible member. The first flexible beam extends in a first direction from a first point on the floating beam to the first rigid element. The second flexible beam extends in a second direction, substantially opposite the first direction, from a second point on the floating beam to the first rigid element. The second point is spatially separated from the first point along the length of the floating beam. The flexible member extends in the first direction from a third point on the floating beam to the second rigid element. The third point is intermediate between the first point and the second point.

Finally, the invention provides a micromachined device that comprises a first rigid element, a second rigid element and a pivot-less Watt linkage-based suspension for supporting the first rigid element relative to the second rigid element to permit relative motion between the rigid elements. The suspension includes pivot-less Watt linkages, each of which comprises an elongate, rigid, floating beam, an elongate first flexible beam, an elongate second flexible beam and a flexible member. The first flexible beam extends in a first direction from a first point on the floating beam to the first rigid element. The second flexible beam extends in a second direction, substantially opposite the first direction, from a second point on the floating beam to the first rigid element. The second point is spatially separated from the first point along the length of the floating beam. The flexible member extends in the first direction from a third point on the floating beam to the second rigid element. The third point is intermediate between the first point and the second point.

The pivot-less Watt linkage and the pivot-less Watt linkage-based suspension of the invention provide several advantages over conventional suspension elements and suspensions currently used in micromachined devices. The pivot-less Watt linkage and the pivot-less Watt linkage-based suspension allow the movable element to move in a direction of motion over a large range of movement. The motion may be along a straight path or a curved path. Additionally, the pivot-less Watt linkage and the pivot-less Watt linkage-based suspension maintain a low compliance in at least one direction orthogonal to the direction of motion as one of the rigid elements is displaced in the direction of motion from its rest position. Further, the pivot-less Watt linkage and the pivot-less Watt linkage-based suspension provide a high efficiency in terms of packing density.

Other features and advantages of the invention will become apparent to one of ordinary skill in the art from the following drawings and detailed description.

BRIEF DESCRIPTION OF THE DRAWINGS

The invention can be better understood with reference to the following drawings. The components in the drawings are not necessarily drawn to scale, emphasis is instead placed upon clearly illustrating the invention. Moreover, in the drawings, like reference numerals designate corresponding components throughout the several views.

FIG. 1A is plan view of a first embodiment of a pivot-less Watt linkage according to the invention in its rest position.

FIG. 1B is a plan view of the floating beam of the pivot-less Watt linkage shown in FIG. 1A.

FIG. 1C is a side view of a layer structure in which the pivot-less Watt linkage shown in FIG. 1A is fabricated.

FIG. 1D is a cross-sectional view of the pivot-less Watt linkage shown in FIG. 1A along the section line 1D—1D.

FIG. 6A is plan view of a fifth embodiment of a pivot-less Watt linkage according to the invention in its rest position.

FIG. 6B is a plan view showing details of one of the flexible beams of the pivot-less Watt linkage shown in FIG. 6A.

DETAILED DESCRIPTION OF THE INVENTION

Figure 2:
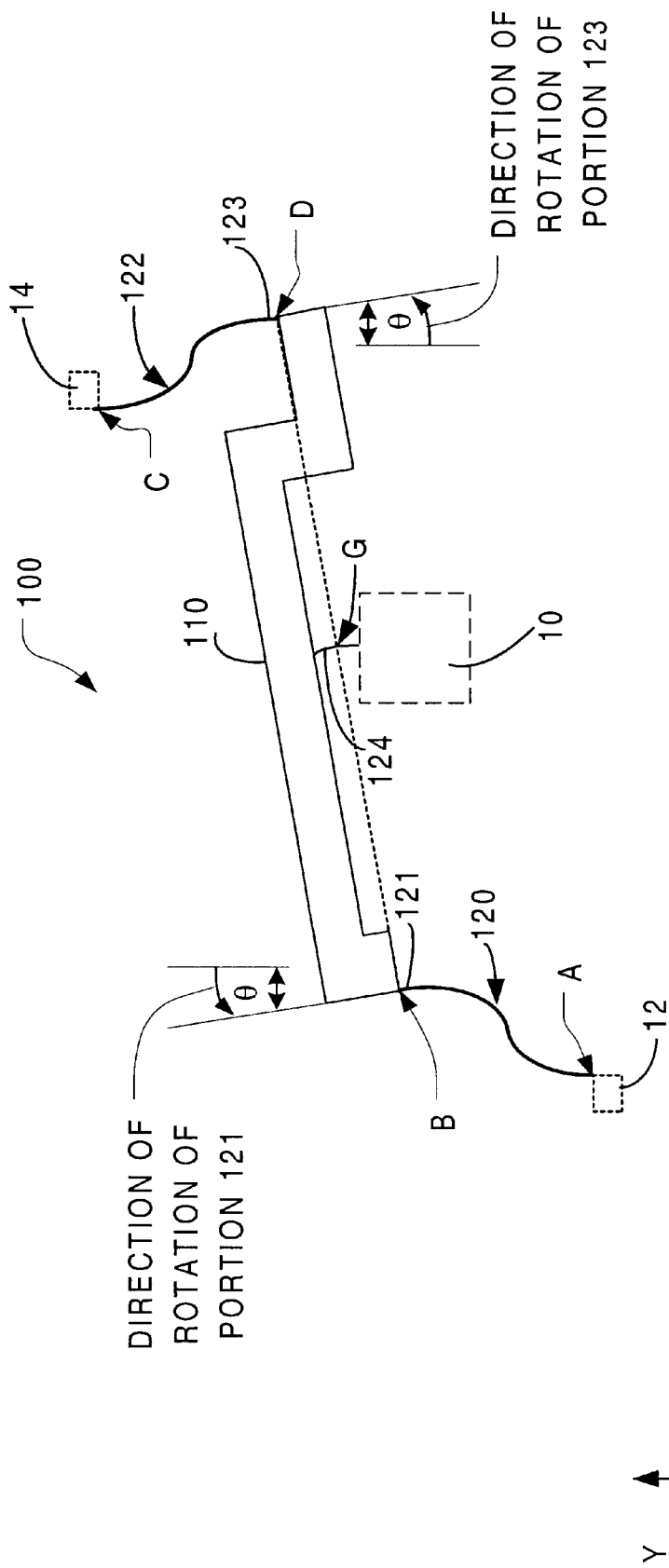
FIG. 2 is a plan view of the pivot-less Watt linkage shown in FIG. 1A displaced in the x-direction from its rest position.

The Watt linkage was invented by James Watt in the last quarter of the $18^{th}$ century to support the piston rod of a beam steam engine. The Watt linkage permitted the piston rod to move freely in a direction of motion along a straight path, but resisted displacement of the piston rod in directions orthogonal to the direction of motion. More recently, Watt linkages have been used in automobiles to locate the rear axle. The Watt linkage permits the axle to move freely up-and-down in a straight path, but prevents the axle from moving side-to-side and back-and-forth.

The Watt linkage supports a movable element, e.g., the piston rod or the axle, relative to a fixed element, e.g., the steam engine frame or the automobile chassis. The Watt linkage is composed of an elongate, rigid, floating member, two elongate and rigid linking members. The linking members each typically have a length several times that of the floating member. Opposite ends of the floating member are each pivotally attached by a fixed pin joint to one end of one of the linking members. The other end of each linking member is pivotally attached by a fixed pin joint to the fixed element. The linking members and the floating member are arranged overall in the shape of a letter Z. The movable element is pivotally attached to the center of the floating member by another fixed pin joint. The Watt linkage allows the movable element to move in a direction of motion substantially parallel to the length of the floating member and orthogonal to the lengths of the linking members.

In micromachined devices, equivalents of a fixed pin joint are difficult to fabricate and are unreliable due to a high rate of wear. As a result, the Watt linkage has not been widely used, if at all, as a suspension element in micromachined devices.

The invention is based on the realization that a pivot-less Watt linkage can be made by eliminating the fixed-pin joints of the conventional Watt linkage, using elongate flexible beams as the linking members, and attaching the movable element to the floating member using a flexible member. Such pivot-less Watt linkage provides a suspension element having many of the desirable properties of the conventional Watt linkage, yet can be fabricated in a single device layer by a simple micromachining process. The pivot-less Watt linkage can alternatively be fabricated by assembling piece parts, but, since it lacks five fixed-pin joints, is substantially simpler and lower in cost than a conventional Watt linkage.

Another aspect of the invention is based on the realization that, in a pivot-less Watt linkage, a point offset along the length of the floating member from the mid point between the flexible beams describes a curved path as the mid point moves along a straight path. Alternatively, the mid point can be made to describe a curved path by making the flexible beams unequal in length. Thus, by locating the flexible member extending from the floating member to the movable element at a point offset along the length of the floating member from the above-mentioned mid point, or by making the flexible beams unequal in length, the pivot-less Watt linkage will permit the portion of the movable element to which it is attached to move along a curved path.

A further aspect of the invention is based on the realization that the flexible beams of the pivot-less Watt linkage may alternatively extend to the movable element instead of to the fixed element and the flexible member may alternatively extend to the fixed element instead of to the movable element. Accordingly, the pivot-less Watt linkage according to the invention will be described as supporting a first rigid element relative to a second rigid element and permitting relative motion between the rigid elements, rather than as supporting a movable element relative to a fixed element and permitting motion of the moveable element.

In the following disclosure, the direction of the motion permitted by the pivot-less Watt linkage according to the invention will be referred to as the x-direction. When the pivot-less Watt linkage permits motion along a curved path, the x-direction is that of a tangent to the curved path in the rest position of the pivot-less Watt linkage. The rest position of the pivot-less Watt linkage is the position in which the flexible beams that form part of the pivot-less Watt linkage are substantially straight. The direction orthogonal to the direction of motion and to the length of the flexible beams will be referred to as the z-direction. The direction orthogonal to both the x- and z-directions will be referred to as the y-direction.

The pivot-less Watt linkage according to the invention, the pivot-less Watt linkage-based suspension according to the invention and the micromachined device according to the invention incorporating such pivot-less Watt linkage-based suspension will be described as being composed of a number of components, and certain ones of the components will be described as being connected or attached to one another. However, preferred embodiments are formed in a single device layer by micromachining. In such embodiments, the elements referred to as components are in fact portions of a unitary structure, and the elements that are described as being connected to one another are in fact integral with one another. The invention encompasses both unitary structures and structures composed of components non-pivotally connected to one another.

FIG. 1A is a plan view showing a first embodiment 100 of a pivot-less Watt linkage according to the invention. The pivot-less Watt linkage 100 is shown in its rest position in which the flexible beams are substantially straight. In pivot-less Watt linkage 100, flexible beams extend in opposite directions from the floating beam to fixed supports that are part of a first rigid element and a flexible member extends from the floating beam to a stage that constitutes a second rigid element. In a typical application, the second rigid element moves freely relative to the first rigid element in a direction of motion indicated as the x-direction.

Pivot-less Watt linkage 100 has a high compliance in the x-direction, and has a low compliance in the y-direction, orthogonal to the direction of motion, even when stage 10 is displaced in the direction of motion from its rest position shown. When the flexible beams that form part of pivot-less Watt linkage 100 have a substantially greater dimension in the z-direction than in the y-direction, pivot-less Watt linkage 100 additionally has a low compliance in the z-direction.

Pivot-less Watt linkage 100 is composed of floating beam 110, flexible beams 120 and 122 and flexible member 124. Floating beam 110, flexible beams 120 and 122 and flexible member 124 are all elongate, i.e., they are all substantially longer than they are wide. Flexible beams 120 and 122 and flexible member 124 are substantially narrower than floating beam 110 so that a force applied to each of flexible beams 120 and 122 and flexible member 124 in the direction of its width would cause such flexible beam or flexible member to bend significantly, whereas the same force applied to floating beam 110 in the direction of its width would cause negligible bending. Thus, in this disclosure, an element is described as flexible when a force applied in a given direction would cause such element to bend significantly, whereas an element is described as rigid when the same force applied in the same direction would cause negligible bending. In particular, flexible beams 120 and 122 and flexible member 124 are each described herein as flexible with respect to a force applied in their width directions, whereas floating beam 110 is described as rigid with respect to such force applied in its width direction. The length of flexible member 124 is substantially less than the lengths of flexible beams 120 and 122.

Floating beam 110 is disposed with its length substantially parallel to the direction of motion. Flexible beam 120 extends in the −y-direction from point B on floating beam 110 to point A on fixed support 12, which is part of the first rigid element. Flexible beam 122 extends in the +y-direction from point D on floating beam 110 to point C on fixed support 14, which is also part of the first rigid element. The remainder of the first rigid element is not shown in FIG. 1A to simplify the drawing. Flexible beam 122 extends from the floating beam in a direction opposite to the direction of extension of flexible beam 120.

The first rigid element includes structure (not shown) that links fixed supports 12 and 14. This structure is rigid in the directions in which flexible beams 120 and 122 apply force to the fixed supports so that the first rigid element maintains the relative positions of points A and C notwithstanding forces applied to it as the second rigid element is displaced in the x-direction.

Points B and D are shown located at opposite ends of floating beams 110. However, this is not critical to the invention. Either or both of points B and D may be inset from the ends of the floating beam as long as they are spatially separated from one another along the length of the floating beam.

Flexible member 124 extends in the −y-direction from point E on floating beam 110 to point F on the second rigid element, i.e., stage 10. Point E is located part-way along the length of the floating beam between points B and D. In embodiments in which the direction of motion is along a straight path, point E is half-way between points B and D.

Point A is the junction between flexible beam 120 and fixed support 12. Point B is the junction between flexible beam 120 and floating beam 110. Point C is the junction between flexible beam 122 and fixed support 14. Point D is the junction between flexible beam 122 and floating beam 110. Point E is the junction between flexible member 124 and floating beam 110. Point F is the junction between flexible member 124 and movable element 10. A point half-way along the length of flexible member 124 is designated as mid point G.

Floating beam 110 has a width $W_1$ and an effective length $L_1$ between the points B and D. The floating beam may extend beyond either or both points B and D, and thus may have a physical length greater than its effective length. Flexible beam 120 has a width $W_2$ and a length $L_2$. Flexible beam 122 has a width $W_3$ and a length $L_3$. Flexible beams 120 and 122 and flexible member 124 are elongate and have widths that are substantially smaller than the width $W_1$ of floating beam 110, as noted above.

In practical embodiments, the widths of flexible beams 120 and 122 and of flexible member 124 were equal to one another and were in the range from 1 μm to 3 μm. The effective length $L_1$ of floating beam 110 was approximately equal to the length of each of flexible beams 120 and 122, and was in the range between 10 μm and 100 μm.

The width $W_1$ of floating beam 110 is substantially larger than the widths $W_2$ and $W_3$ of flexible beams 120 and 122, respecitvely, so that the floating beam rigidly interconnects points B and D. Since the flexible beams extend from the floating beam in opposite directions, the line AC interconnecting points A and C intersects the line BD interconnecting points B and D. In a preferred embodiment, the distance between points A and C is greater than the sum of the lengths of flexible beams 120 and 122, i.e., AC>AB+CD. However, this is not critical to the invention. The invention encompasses embodiments in which the distance between points A and C is equal to, or less than, the sum of the lengths of the flexible beams.

In the example shown in FIG. 1A, floating beam 110 has the complex shape shown in FIG. 1B. The floating beam is shaped to orient line BD, connecting points B and D, substantially orthogonal to the lengths of flexible beams 120 and 122 in the rest position of pivot-less Watt linkage 100. The floating beam is additionally shaped to locate mid point G, half-way along the length of flexible member 124, substantially on line BD.

Floating beam 110 can be regarded as being composed of a tandem arrangement of first beam section 141, third beam section 143 and second beam section 142. Only one of the beam sections need be elongate, i.e., second beam section 142 can be shorter than shown. Point B is located in first beam section 141. Point E is located in third beam section 143. Point D is located in second beam section 142.

Third beam section 143 links first beam section 141 to second beam section 142. First beam section 141 is laterally offset relative to third beam section 143 by an offset amount substantially equal to one-half of the length of flexible member 124. Second beam section 142 is laterally offset relative to third beam section 143 by an offset amount substantially equal to the sum of the width of floating beam 110 and one-half of the length of flexible member 124. This orients line BD substantially parallel to the length of third beam section 143, and substantially orthogonal to flexible beams 120 and 122 in the rest position of pivot-less Watt linkage 100. This also locates mid point G of flexible member 124 on line BD.

Alternatively, floating beam 110 may be shaped to locate points B and D and mid point G of flexible member 124 on line BD substantially orthogonal to flexible beams 120 and 122 by configuring it with a width that is substantially constant width over most of its length, but that is reduced by appropriate amounts in the vicinities of points B, D and E.

Flexible beams 120 and 122 are shown in FIG. 1A as extending from floating beam 110 anti-parallel to one another. However, this is not critical to the invention, and flexible beams 120 and 122 may extend from the floating beam in directions that are not anti-parallel to one another.

FIG. 2 shows pivot-less Watt linkage 100 displaced from its rest position as a result of stage 10 being displaced generally in the x-direction. Displacement of the stage in the x-direction causes flexible beams 120 and 122 each to bend lengthways as shown. The flexible beams 120 and 122 bending causes floating beam 110 to rotate counter-clockwise about mid point G. The rotation of the floating beam causes flexible member 124 to bend lengthways as shown, and additionally causes the portions 121 and 123 of the flexible beams 120 and 122, respectively, each to rotate. Portion 121 is a short portion of flexible beam 120 immediately adjacent floating beam 110. Portion 123 is short portion of flexible beam 122 immediately adjacent floating beam 110. The directions of rotation of the portions 121 and 123 are indicated in the figure, and the angle of rotation is indicated as θ. The bending of the flexible beams and of the flexible member and the rotations of the floating beam and of the flexible beam portions 121 and 123 increase progressively as the displacement of the stage in the x-direction increases. Points B and D follow circular paths in the plane of the pivot-less Watt linkage 100, while mid point G moves in a straight line in the x-direction, at least initially.

The pivot-less Watt linkage 100 has a low compliance with respect to forces in the y-direction, orthogonal to the x-direction. For mid point G to move in they-direction requires that points B and D on floating beam 110 move in the y-direction without moving in the x-direction. With these boundary conditions, the ratio of the compliance of the pivot-less Watt linkage 100 in the y-direction to that in the x-direction can be expressed as follows:

$$C_{my}/C_{mx} \sim (w/L)^2 + 0.018(\delta x/L)^2 \qquad (1)$$

where $C_{mx}$ is the mechanical compliance of pivot-less Watt linkage 100 in the direction of motion (x-direction), $C_{my}$ is the mechanical compliance in the y-direction, orthogonal to the direction of motion, w and L are the width and length, respectively, of flexible beams 120 and 122, and δx is the displacement of mid point G in the x-direction. In FIG. 1A, the widths of flexible beams 120 and 122 are indicated as $W_2$ and $W_3$, respectively, and the lengths of flexible beams 120 and 122 are indicated as $L_2$ and $L_3$, respectively.

The small prefactor that multiplies the $(\delta x/L)^2$ term indicates that, as mid point G is displaced in the x-direction and flexible beams 120 and 122 bend, the compliance of pivot-less Watt linkage 100 in the y-direction increases, but with small rate of change with respect to the displacement in the x-direction.

If floating beam 110 were infinitely long, mid point G would move exclusively in the x-direction over the entire range of motion of flexible beams 120 and 122. At small displacements, points B and D would both follow paths that approximate closely to arcs of a circle with a radius of curvature $R_c$ approximately equal to 0.83 L, where L is the length of flexible beams 120 and 122, as described above. The line BD connecting points B and D would be a tangent to each of the arcs.

As the displacement of mid point G increases beyond about 15% of the lengths of flexible beams 120 and 122, the paths of points B and D would deviate progressively from the above-mentioned arcs. However, the paths of points B and D would continue to be symmetrical about line BD.

Displacement of mid point G would displace points B and D by equal distances. As a result, mid point G would move exclusively in the x-direction.

In practical embodiments of pivot-less Watt linkage 100, floating beam 110 is not infinitely long. As a result, floating beam 110 rotates as shown in FIG. 2 when mid point G of flexible member 124 is displaced generally in the x-direction. As a result, the displacement of mid point G additionally includes a small, parasitic component in the −y-direction. Because the floating beam is non-pivotally attached to flexible beams 120 and 122, the rotation of floating beam 110 causes portions 121 and 123 of flexible beams 120 and 122, respectively, to rotate. The rotation of the floating beam causes the paths of points B and D to be non-symmetrical about the rest position of the floating beam. As a result, the motion of mid point G is no longer exclusively in the x-direction, but additionally includes a component in the −y-direction. The displacement δy of point B in the y-direction resulting from a displacement of δx of mid point G in the x-direction is expressed as follows:

$$\delta y \approx L\left(1 - \frac{3}{5}\left(\frac{\delta x}{L}\right)^2 - \frac{\theta}{10}\left(\frac{\delta x}{L}\right) - \frac{\theta^2}{15}\right) \quad (2)$$

where L is the length of floating beams 120 and 122 and θ is the angle between the length of portion 121 of flexible beam 120 and the y-axis and between the length of portion 123 of flexible beam 122 and the y-axis. In FIG. 1A, the lengths of flexible beams 120 and 122 are indicated by $L_2$ and $L_3$, respectively. When the angle θ has a non-zero value, the cross-axis term in equation (2) causes mid point G to move in the y-direction by a distance $\delta y_G$. To the lowest order, the displacement $\delta y_G$ is expressed as follows:

$$\delta y_G \approx \frac{-0.12(\delta x)^3}{L \cdot L_1} \quad (3)$$

where $L_1$ is the effective length of floating beam 110, i.e., the distance between points B and D. In FIG. 1A, the distance between points B and D is indicated by $L_1$.

Equation 3 shows that, when stage 10 is displaced in the +x-direction, as shown in FIG. 2, the displacement of mid point G of flexible member 124 has components in the +x-direction and additionally in the −y-direction. In an embodiment of pivot-less Watt linkage 100 in which $L_1$ is approximately equal to L, then δy≈L/1000 when δx=0.20 L. Specifically, in an exemplary embodiment in which the effective length $L_1$ of floating beam 110 is 500 μm, and the length of each of flexible beams 120 and 122 is 500 μm, displacement of mid point G by 100 μm in the x-direction will result in mid point G additionally being displaced by 0.5 μm in the −y-direction.

The displacement of mid point G in the −y-direction for a given displacement of stage 10 in the x-direction is a minimum when point E is located mid-way between points B and D along the length of floating beam 110. As mid point G is displaced in the x-direction, a point located on line BD with an offset Δx from the mid-point half way between points B and D moves substantially along the arc of a circle with a radius $R_c$ given by:

$$R_c \approx \frac{0.417 L \cdot L_1}{\Delta x} \quad (4)$$

where $L_1$ is the effective length of floating beam 110, i.e., the distance between points B and D, and L is the length of flexible beams 120 and 122. Thus, as will be described below with reference to FIG. 8, a pivot-less Watt linkage-based suspension in which the flexible member 124 extends from the floating beam at a point offset along the length of the floating beam from the mid-point between points B and D will cause the portion of the stage to which the flexible member extends to move along a curved path.

Fabrication of the pivot-less Watt linkage 100 will now be described with reference to FIGS. 1C and 1D. FIG. 1C is a side view of layer structure 150 in which the pivot-less Watt linkage is fabricated. The layer structure is composed of substrate 152, connection layer 154 and device layer 156. Connection layer 154 is a layer of a material that can be selectively etched or otherwise removed by a process that minimally etches or otherwise removes the materials of layers 152 and 156. In a preferred embodiment in which the material of substrate 152 was single crystal silicon and the material of device layer 156 was single-crystal silicon or polysilicon, the connection layer was a layer of silicon dioxide.

Pivot-less Watt linkage 100 is fabricated in device layer 156 by a photolithographic process. In the photolithographic process, a masking layer (not shown), such as a layer of photoresist, PMMA, or photoetchable glass, is first deposited on device layer 156 and is patterned in the shape of pivot-less Watt linkage 100 by a lithographic process. The pattern defined in the masking layer is then transferred to the underlying device layer using an anisotropic etch process. The etch process leaves the micromachined device defined in the device layer. Alternatively, laser ablation or chemically-assisted laser etching could be used to pattern the device layer. In an embodiment, the device layer is a layer of silicon having a substantially uniform thickness. However, other materials, such as glasses, metals, or other semiconductors, may be used as the device layer.

FIG. 1D is a cross sectional view of pivot-less Watt linkage 100 along the section line 1D—1D shown in FIG. 1A. Portions of connection layer 154 have been selectively removed to release pivot-less Watt linkage 100 from substrate 152. The figure shows the portions of device layer 156 that constitute floating beam 110 and flexible beam 120 spaced from substrate 152 by a gap formerly occupied by connection layer 154. Only the portions of the device layer that constitute fixed supports 12 and 14 remain attached to the substrate by remaining portions of the connection layer. Substrate 152, fixed supports 12 and 14 and the remaining portions of connection layer 154 connecting the fixed supports to the substrate collectively constitute the first rigid element in the example shown.

Fabricating pivot-less Watt linkage 100 by the process just described results in all of the components of the pivot-less Watt linkage having the same thickness, i.e., dimension in the z-direction. The thickness of the components is defined by the thickness of device layer 156. Thus, the components differ from one another only in width, length and shape. Moreover, the pivot-less Watt linkage has a constant cross sectional shape in the x–y plane, parallel to the major surface of device layer 156, throughout the depth of the device layer in the z-direction.

The pivot-less Watt linkage shown in FIG. 1A works well when its components all have the same thickness and when it has a cross-sectional shape that is constant throughout the depth of the device layer. Moreover, the fabrication process just described is considerably simpler than one that would be required to fabricate pivot-less Watt linkage 100 with components having different thicknesses or with a cross-sectional shape that changes with depth.

Practical embodiments have a device layer 156 that ranges in thickness from about 0.1 µm to several hundred µm. In a preferred embodiment, the device layer had a thickness of 100 µm.

The fabrication process was described above with reference to an example in which the device layer 156 was supported by substrate 152 during fabrication. However, this is not critical to the invention. The pivot-less Watt linkage may be fabricated in a device layer unsupported by a substrate. After the pivot-less Watt linkage has been fabricated, flexible beams 120 and 122 are non-pivotally attached to the first rigid element. Fixed supports corresponding to the device layer portion of fixed supports 12 and 14 may be fabricated in the same process as the pivot-less Watt linkage to facilitate attachment of the flexible beams to the first rigid element.

Figure 3A:
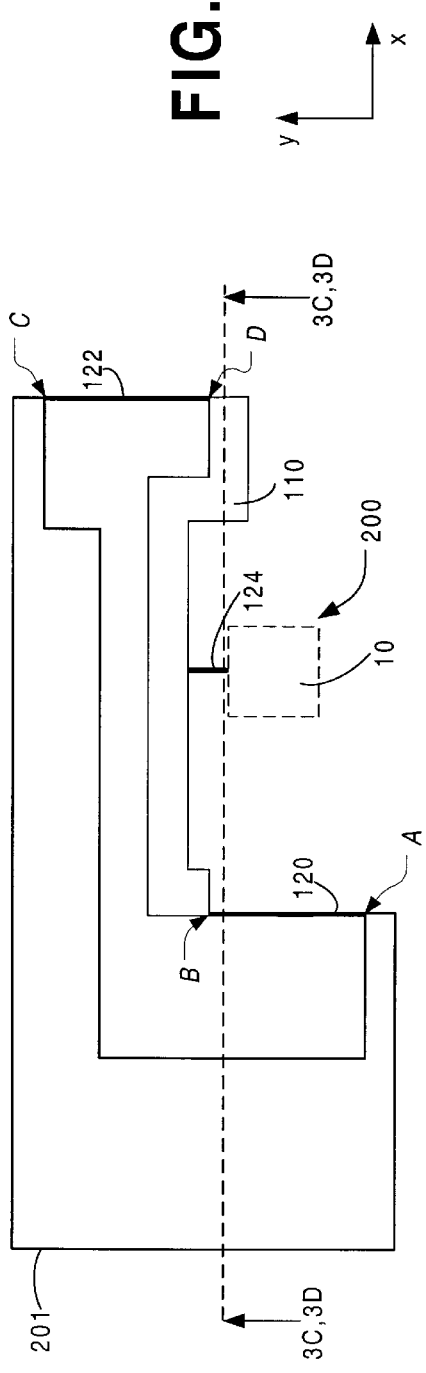
FIG. 3A is plan view of a second embodiment of a pivot-less Watt linkage according to the invention in its rest position.

FIG. 3A shows a second embodiment 200 of a pivot-less Watt linkage according to the invention. The pivot-less Watt linkage includes a perimeter frame that constitutes at least part of the first rigid element. The perimeter frame provides the fixed supports for the ends of the flexible beams remote from the floating beam and thus defines the relative positions of points A and C. The perimeter frame enables the pivot-less Watt linkage to be fabricated in a single device layer, or in a layer structure in which the first rigid element is attached to the substrate by a large, easy-to-fabricate connection. Elements of pivot-less Watt linkage 200 that correspond to elements of pivot-less Watt linkage 100 described above with reference to FIG. 1A are indicated by the same reference numerals and will not be described again here.

Pivot-less Watt linkage 200 includes substantially C-shaped perimeter frame 201 that extends between the ends of flexible beams 120 and 122 remote from floating beam 110. Points A and C on flexible beams 120 and 122, respectively, are located at the perimeter frame.

The distance between points A and C through perimeter frame 201 is substantially greater than the width of the perimeter frame. The width of the perimeter frame is such that a force applied to the perimeter frame in the direction of its width would cause negligible bending of the perimeter frame. Thus, perimeter frame 201 is described as rigid with respect to such force. The rigidity of the perimeter frame enables the perimeter frame to define the relative positions of points A and C in a manner similar to the fixed supports 12 and 14 shown in FIG. 1A. In particular, the perimeter frame maintains the relative positions of points A and C notwithstanding forces applied to the perimeter frame by flexible beams 120 and 122 as the second rigid element is displaced in the x-direction.

Figure 3B:
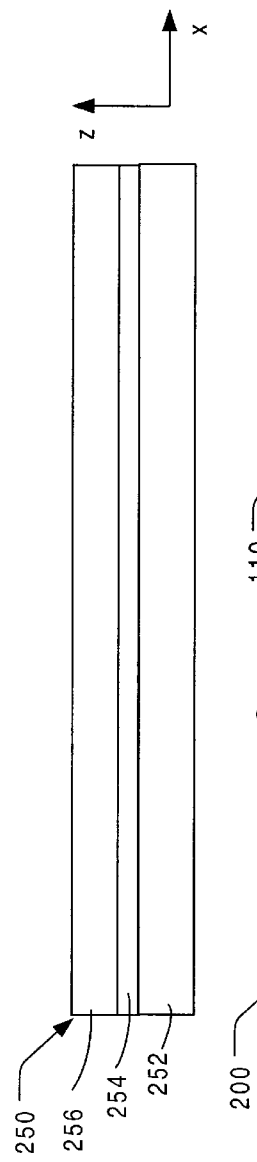
FIG. 3B is a side view of a layer structure in which the pivot-less Watt linkage shown in FIG. 3A is fabricated.

FIG. 3B is a side view of layer structure 250 in which pivot-less Watt linkage 200 is fabricated. The layer structure is composed of substrate 252, connection layer 254 and device layer 256. Connection layer 254 is a layer of a material that can be selectively etched or otherwise removed by a process that minimally etches or otherwise removes the materials of layers 252 and 256. In a preferred embodiment, the material of substrate 252 was single crystal silicon, the material of device layer 256 was single-crystal silicon or polysilicon and the connection layer 254 was a layer of silicon dioxide. The pivot-less Watt linkage is formed in the device layer by a photolithographic process, such as that described above with reference to FIGS. 1C and 1D.

Figure 3C:
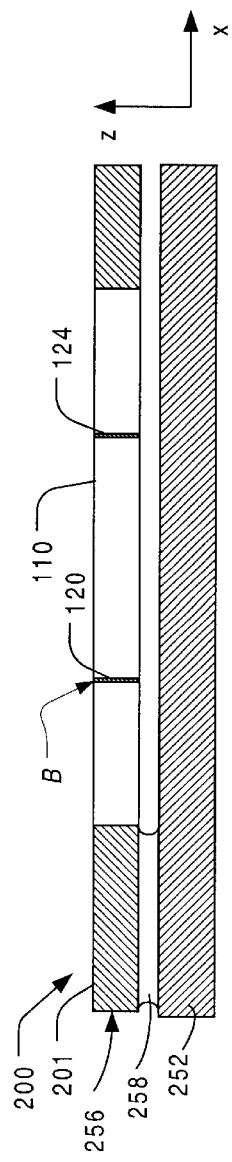
FIG. 3C is a cross-sectional view of a first example of the pivot-less Watt linkage shown in FIG. 3A along the section line 3C,3D—3C,3D.

FIG. 3C is a cross-sectional view of a first example of pivot-less Watt linkage 200 formed in multi-layer structure 250. Perimeter frame 201 and the remaining components of pivot-less Watt linkage 200 are formed in device layer 256. The second rigid element (not shown) supported by the pivot-less Watt linkage 200 may also be formed in the device layer. After pivot-less Watt linkage 200 has been defined in device layer 256, connection layer 254 is selectively removed to leave the part of the perimeter frame shown attached to substrate 252 by the large island 258 that formerly was part of connection layer 254. Thus, the perimeter frame, the substrate and the island 258 collectively constitute the first rigid element in this example.

Figure 3D:
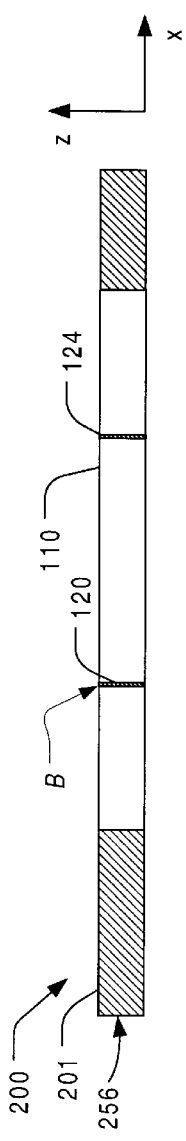
FIG. 3D is a cross-sectional view of a second example of the pivot-less Watt linkage shown in FIG. 3A along the section line 3C,3D—3C,3D.

FIG. 3D is a cross-sectional view of a second example of pivot-less Watt linkage 200 formed as a single-layer device in device layer 256. The pivot-less Watt linkage is formed in multi-layer structure 250 shown in FIG. 3B. After pivot-less Watt linkage 200 has been defined in the device layer, connection layer 254 is completely removed to detach the single-layer pivot-less Watt linkage from the substrate.

The first rigid element of which perimeter frame 201 constitutes at least part may itself be movable in the x-direction, the y-direction or another direction. When the first rigid element is movable, it is supported relative to a third rigid element (not shown) by an additional suspension that is preferably composed of pivot-less Watt linkages. For example, the first rigid element may be movable in the y-direction relative to the third rigid element to provide x–y positioning of stage 10. Alternatively, the first rigid element may be movable in the x-direction relative to the third rigid element to provide coarse-fine positioning of stage 10.

Figure 4:
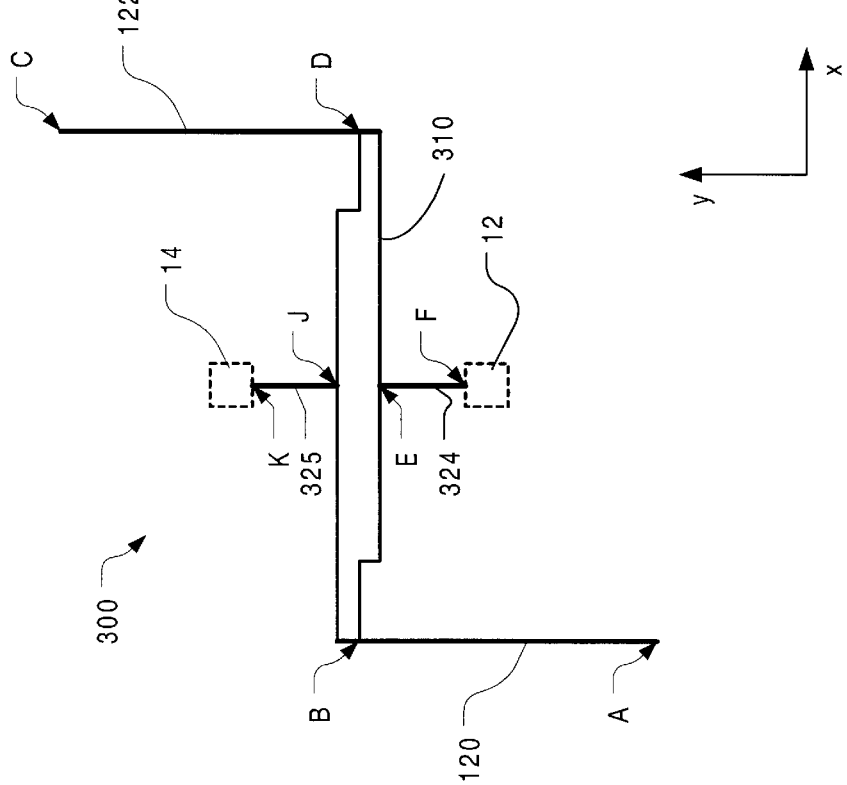
FIG. 4 is plan view of a third embodiment of a pivot-less Watt linkage according to the invention in its rest position.

FIG. 4 is a plan view of a third embodiment 300 of a pivot-less Watt linkage according to the invention. In pivot-less Watt linkage 300, the flexible beams extend in opposite directions from the floating beam to the first rigid element and flexible members extend in opposite directions from the floating beam to fixed supports that are part of the second rigid element. In a typical application, the first rigid element moves freely relative to the second rigid element in a direction of motion indicated as the x-direction. Elements of pivot-less Watt linkage 300 that correspond to elements of pivot-less Watt linkage 100 described above with reference to FIG. 1A are indicated by the same reference numerals and will not be described again here.

Pivot-less Watt linkage 300 is composed of floating beam 310, flexible beams 120 and 122 and flexible members 324 and 325. Floating beam 310, flexible beams 120 and 122 and flexible members 324 and 325 are all elongate. Flexible beams 120 and 122 and flexible members 324 and 325 are substantially narrower than floating beam 310. Accordingly, flexible beams 120 and 122 and flexible members 324 and 325 are each flexible with respect to a force applied in the direction of their widths, whereas floating beam 310 is rigid with respect to such force, as described above. The lengths of flexible members 324 and 325 are less than those of flexible beams 120 and 122.

Floating beam 310 is disposed with its length substantially parallel to the direction of motion. Flexible beam 120 extends in the −y-direction from point B on floating beam 310 to point A on the first rigid element (not shown, but see FIG. 9). Flexible beam 122 extends in the +y-direction from point D on floating beam 310 to point C on the first rigid element. Thus, flexible beam 122 extends from the floating beam in the direction opposite to the direction of extension of flexible beam 120. Points B and D are shown located at opposite ends of floating beams 310. However, this is not critical to the invention. Either or both of points B and D may be inset from the ends of the floating beam as long as they are spatially separated from one another along the length of the floating beam.

Flexible member 324 extends in the −y-direction from point E on floating beam 310 to point F on fixed support 12, which is part of the second rigid element. Flexible member 325 extends in the +y-direction from point J on floating beam 310 to point K on fixed support 14, which is also part the second rigid element. Thus, flexible member 325 extends from the floating beam in the direction opposite to the direction of extension of flexible member 324. Points E and J are located opposite one another, part-way between points B and D along the length of the floating beam. In the example shown, points E and J are mid-way between points B and D.

The first rigid element includes structure (not shown) that links points A and C. This structure is rigid in the directions in which flexible beams 120 and 122 apply force to the first rigid element. Thus, the first rigid element maintains the relative positions of points A and C notwithstanding forces applied to it by the flexible beams as the first rigid element is displaced in the x-direction.

Point A is the junction between flexible beam 120 and the first rigid element (not shown). Point B is the junction between flexible beam 120 and floating beam 310. Point C is the junction between flexible beam 122 and the first rigid element. Point D is the junction between flexible beam 122 and floating beam 310. Point E is the junction between flexible member 324 and floating beam 310. Point F is the junction between flexible member 324 and fixed support 12, part of the second rigid element. Point J is the junction between flexible member 325 and floating beam 310. Point K is the junction between flexible member 325 and fixed support 14, part of the second rigid element.

Floating beam 310 is shaped to locate points B and D and a point mid-way between points E and J on a straight line substantially orthogonal to the lengths of flexible beams 120 and 122 in the rest position of pivot-less Watt linkage 300. In the example shown, this is achieved by halving the width of the floating beam in the vicinity of the attachment points B and D to locate the attachment points on the center line of the floating beam. In another example, the floating beam is shaped to define at each of its ends a laterally offset portion similar to, but with a smaller lateral offset than, beam section 142 of floating beam 110 shown in FIG. 1B. The floating beam may be shaped in other ways to achieve the above-described condition.

For any displacement in the y-direction imparted on, for example, point A, by the movable element, flexible beam 120 and floating beam 310 impart, via flexible beam 122, an identical but opposite displacement of point C. Such displacement of point C counteracts the displacement of point A and provides pivot-less Watt linkage 300 with its low compliance in the y-direction.

The process described above with reference to FIGS. 1C and 1D, or another suitable process, may be used to make pivot-less Watt linkage 300.

Pivot-less Watt linkage 300 may be simplified by omitting flexible member 325 and by shaping floating beam 310 to locate points B and D and the mid-point of flexible member 324 on a straight line substantially orthogonal to the lengths of flexible beams 120 and 122 in the rest position of pivot-less Watt linkage 300. This may be achieved by shaping floating beam 310 similarly to floating beam 110 shown in FIG. 1A, for example. When flexible member 325 is omitted, fixed support 14 may be omitted from the second rigid element. Alternatively, flexible member 324 and fixed support 12 may be omitted.

Figure 5:
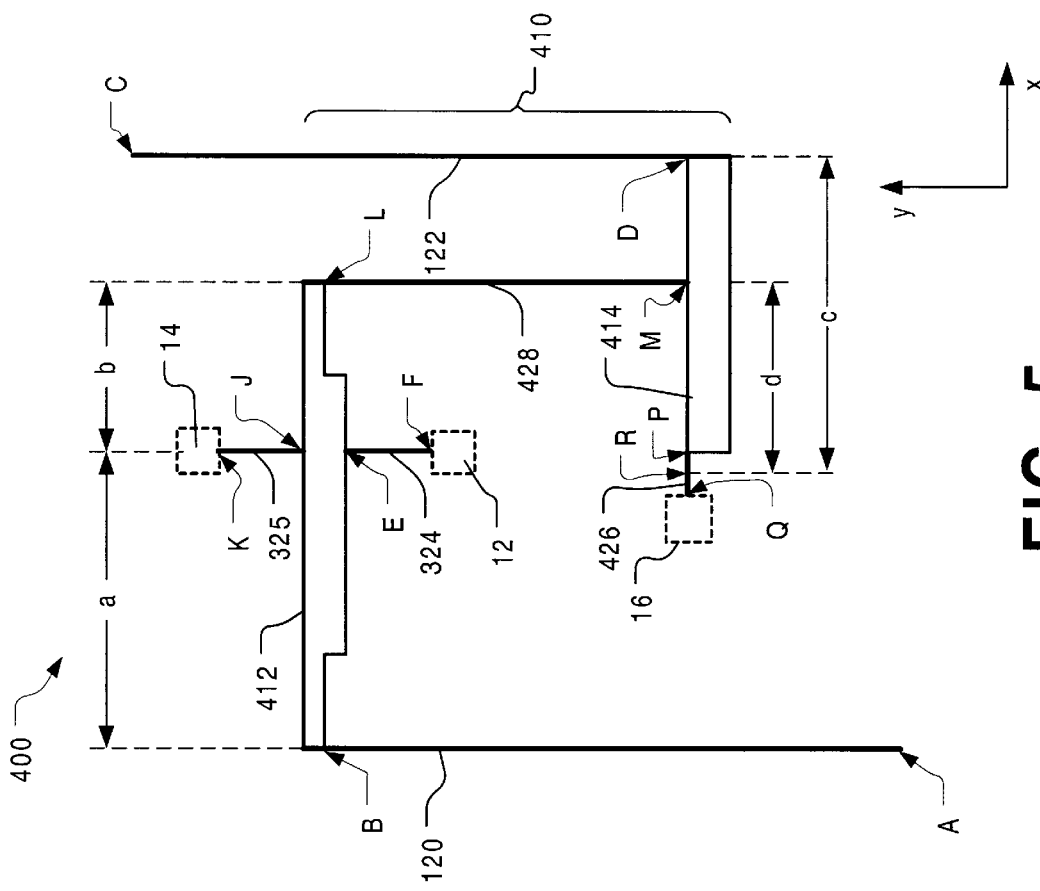
FIG. 5 is plan view of a fourth embodiment of a pivot-less Watt linkage according to the invention in its rest position.

FIG. 5 is a plan view of a fourth embodiment 400 of a pivot-less Watt linkage according to the invention in which the floating beam has a compound structure. The floating beam is composed of first rigid beam section, a second rigid beam section and a third flexible beam that extends from the first rigid beam section to the second rigid beam section. Points B and E are located in the first rigid beam section and point D is located in the second beam section. An additional flexible member extends parallel to the second rigid beam section from a point on the second rigid beam section remote from point D to an additional fixed support that is part of the second rigid element.

In pivot-less Watt linkage 400, flexible beams extend in opposite directions from the compound floating beam to the first rigid element, and flexible members extend from the compound floating beam to fixed supports that are part of the second rigid element. In a typical application, the first rigid element moves freely relative to the second rigid element in a direction of motion indicated as the x-direction. Elements of pivot-less Watt linkage 400 that correspond to elements of pivot-less Watt linkages described above with reference to FIGS. 1A and 4 are indicated by the same reference numerals and will not be described again here.

Pivot-less Watt linkage 400 is composed of compound floating beam 410, flexible beams 120 and 122 and flexible members 324 and 325. Compound floating beam 410 is composed of rigid beam section 412, rigid beam section 414, flexible beam 428 and flexible member 426. Rigid beam sections 412 and 414, flexible beams 120, 122 and 428 and flexible members 324, 325 and 426 are all elongate. Flexible beams 120, 122 and 428 and flexible members 324, 325 and 426 are substantially narrower than rigid beam sections 412 and 414. Accordingly, flexible beams 120, 122 and 428 and flexible members 324, 325 and 426 are each flexible with respect to a force applied in the direction of their widths, whereas rigid beam sections 412 and 414 are rigid with respect to such force, as described above. The lengths of flexible members 324, 325 and 426 are less than the lengths of flexible beams 120, 122 and 428.

Rigid beam sections 412 and 414 are each disposed with their lengths substantially parallel to the direction of motion. Flexible beam 120 extends in the −y-direction from point B on rigid beam section 412 to point A on the first rigid element (not shown, but see FIG. 10). Flexible beam 122 extends in the +y-direction from point D on rigid beam section 414 to point C on the first rigid element. Thus, flexible beam 122 extends from rigid beam section 414 in the direction opposite to the direction in which flexible beam 120 extends from rigid beam section 412. Flexible beam 428 extends in the −y-direction from point L on rigid beam section 412 to point M on rigid beam section 414. Point L is more remote from point B along the length of rigid beam section 412 than point E is from point B. Point M is located part-way along the length of rigid beam section 414, and is spatially separated from point D.

Points B and L are shown located at opposite ends of rigid beam section 412. However, this is not critical to the invention. Either or both of points B and L may be inset from the ends of rigid beam section 412 as long as they are on opposite sides of point E.

Flexible member 324 extends in the −y-direction from point E on rigid beam section 412 to point F on fixed support 12, which is part of the second rigid element. Flexible member 325 extends in the +y-direction from point J on rigid beam section 412 to point K on fixed support 14, which is also part of the second rigid element. Thus, flexible member 325 extends from rigid beam section 412 in the direction opposite to the direction of extension of flexible member 324. Points E and J are located opposite one another, part-way between points B and L along the length of rigid beam section 412.

Flexible member 426 extends in the −x-direction, parallel to rigid beam section 414, from point P on rigid beam section 414 to point Q on fixed support 16, which is also part of the second rigid element. Point P is located on the opposite side of point M from point D. Flexible member 426 is offset in the −y-direction from the center line of rigid beam section 414 to locate points P, M and D on a straight line substantially orthogonal to the lengths of flexible beams 120 and 122 in the rest position of pivot-less Watt linkage 400.

The first rigid element includes structure (not shown) that links points A and C. This structure is rigid in the directions in which flexible beams 120 and 122 apply force to the first rigid element. Thus, the first rigid element maintains the relative positions of points A and C notwithstanding forces applied to it by the flexible beams as the first rigid element is displaced in the x-direction.

Points D and P are shown located at the ends of rigid beam section 414. However, this is not critical to the invention. Either or both of points D and P may be inset from the ends of the rigid beam sections as long as they are spatially separated from one another and from point M in the x-direction.

Figure 10:
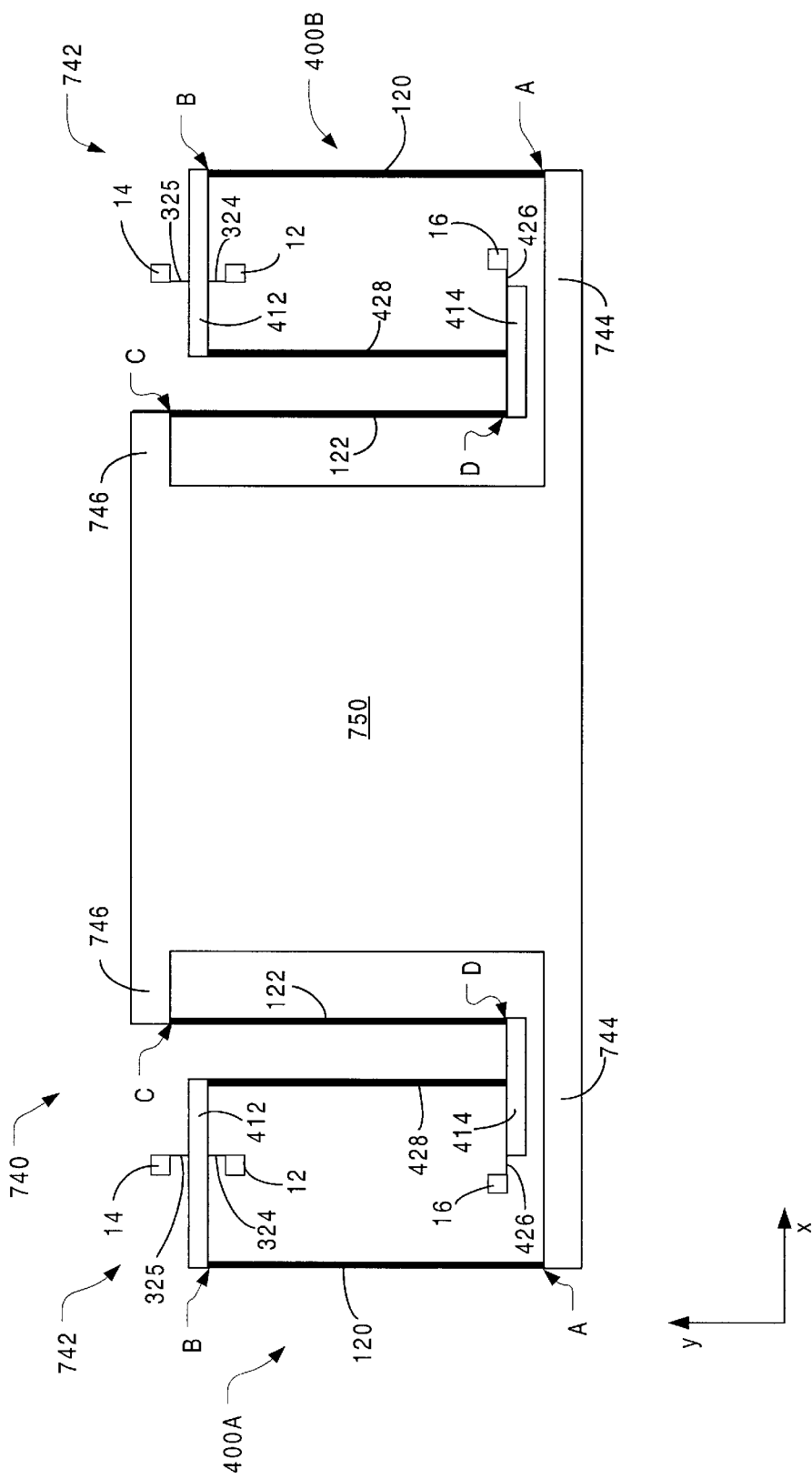
FIG. 10 is a plan view of a fourth embodiment of a micromachined device according to the invention incorporating a pivot-less Watt linkage-based suspension according to the invention.

Point A is the junction between flexible beam 120 and the first rigid element (not shown, but see FIG. 10). Point B is the junction between flexible beam 120 and rigid beam section 412. Point C is the junction between flexible beam 122 and the first rigid element. Point D is the junction between flexible beam 122 and rigid beam section 414. Point E is the junction between flexible member 324 and rigid beam section 412. Point F is the junction between flexible member 324 and fixed support 12, which is part of the second rigid element. Point J is the junction between flexible member 325 and rigid beam section 412. Point K is the junction between flexible member 325 and fixed support 14, which is part of the second rigid element. Point L is the junction between flexible beam 428 and rigid beam section 412. Point M is the junction between flexible beam 428 and rigid beam section 414. Point P is the junction between flexible member 426 and rigid beam section 414. Point Q is the junction between flexible member 426 and fixed support 16, which is part of the second rigid element.

Rigid beam section 412 is shaped to locate points B and L and a point mid-way between points E and J on a straight line substantially orthogonal to flexible beams 120 and 122 in the rest position of pivot-less Watt linkage 400. In the example shown, this is achieved by halving the width of rigid beam section 412 in the vicinity of the attachment points B and L to locate the attachment points on the center line of the rigid beam section. Alternatively, rigid beam section 412 can be shaped in the vicinity of attachment points B and L to define a laterally-offset portion similar to, but with a smaller lateral offset than, beam section 142 of floating beam 110 shown in FIG. 1B. Rigid beam section 412 may be shaped in other ways to achieve the above-described condition.

For any displacement in the y-direction imparted on, for example, point A, by the movable element, flexible beam 120, rigid beam section 412, flexible member 428 and rigid beam section 414 impart, via flexible beam 122, an equal but opposite displacement on point C. Such displacement of point C counteracts the displacement of point A and provides pivot-less Watt linkage 400 with a low compliance in the y-direction.

Equal but opposite displacement of point C relative to point A is achieved by making the product of the distance a between points B and E on rigid beam section 412 and the distance d between mid point R of flexible member 426 and point M on rigid beam section 414 equal to the product of the distance b between points E and L on rigid beam section 412 and the distance c between mid point R of flexible member 426 and point D on rigid beam section 414, i.e., a×d=b×c.

Alternatively, equal but opposite displacement of point C relative to point A is achieved by making the distance a between points B and E on rigid beam section 412 equal to the distance c between mid point R of flexible member 426 and point D on rigid beam section 414, and the distance b between points E and L on rigid beam section 412 equal to the distance d between mid point R on flexible member 426 and point M on rigid beam section 414, i.e., a=c and b=d.

In embodiments of pivot-less Watt linkage 400 in which flexible beams 120 and 122 are equal in length, the equal but opposite displacements of points A and C provided by the above-described relationships between lengths a, b, c and d provide relative motion between the first rigid member and the second rigid member along a straight path. In embodiments in which flexible beams 120 and 122 differ in length, relative motion along a straight path is provided by relationships between lengths a, b, c and d different from those described above. Specifically, the relationship L2×a×d=L3×b×c, where the lengths of the flexible beams 120 and 122 are L2 and L3, respectively, provides relative motion along a straight path. With this relationship, the positions of points A and C do not move in the y-direction relative to fixed supports 330 and 434 as the flexible beams 120 and 122 bend.

Pivot-less Watt linkage 400 may be simplified by omitting flexible member 325 and fixed support 14, and by shaping rigid beam portion 412 to locate points B and L and the mid-point between points E and J across the width of rigid beam portion 412 on a straight line substantially orthogonal to the length of flexible beams 120 and 122 in the rest position of pivot-less Watt linkage 400. When flexible member 325 is omitted from the pivot-less Watt linkage, fixed support 14 may be omitted from the second flexible element. Alternatively, flexible member 324 and fixed support 12 may be omitted.

In the pivot-less Watt linkages 100, 200 and 300 described above, the length of each of flexible beams 120 and 122 is less than one-half of the overall dimension of the pivot-less Watt linkage in the y-direction, orthogonal to the direction of motion. In the pivot-less Watt linkage 400, the length of each of flexible beams 120 and 122 is less than, but substantially more than one-half of, the overall dimension of the pivot-less Watt linkage in the y-direction. Thus, flexible beams 120 and 122 of pivot-less Watt linkage 400 are almost twice as long as the flexible beams of the other pivot-less Watt linkage embodiments for a given dimension of the pivot-less Watt linkage in the y-direction. As a result, for a given width of the flexible beams and a given overall dimension of the pivot-less Watt linkage in the y-direction, the compliance of pivot-less Watt linkage 400 in the direction of motion is substantially greater than that of the other embodiments.

The process described above with reference to FIGS. 1C and 1D, or another suitable process, may be used to make the pivot-less Watt linkage 400.

FIG. 6A is a plan view of a fifth embodiment 500 of a pivot-less Watt linkage according to the invention in which each of flexible beams is shaped to define a portion of increased width. The pivot-less Watt linkage 500 is based on the pivot-less Watt linkage 100 described above with reference to FIG. 1A, and elements of the pivot-less Watt linkage 500 that correspond to elements of the pivot-less Watt linkage 100 are indicated using the same reference numerals and will not be described again here. The flexible beams of the pivot-less Watt linkages described above with reference to FIGS. 3A, 4 and 5 may be similarly shaped.

In the pivot-less Watt linkage 500, each of flexible beams 520 and 522 is shaped to define a portion of increased width. The portion of increased width extends part-way along the length of the flexible beam and reduces the compliance of the flexible beam compared with that of a flexible beam that lacks such portion. The reduced compliance decreases the compliance of the pivot-less Watt linkage in directions orthogonal to the direction of motion at the expense of a reduced compliance in the direction of motion.

FIG. 6B shows an example of flexible beam 520 in which the portion of increased width 562 is located substantially mid-way along the length of the flexible beam. The portion of increased width has a width $w_1$ greater than the width $w_2$ of end portions 564 and 565. For example, the width $w_1$ is between two and ten times the width $w_2$. In a preferred embodiment, portion 562 constitutes at least half of the length of flexible beam 520. Flexible beam 522 may be similarly shaped.

The above-described pivot-less Watt linkages according to the invention may be easily adapted to specific applications. For example, a micromachined device in which one of the rigid elements moves in only one direction from its rest position may be fabricated so that, in the rest position of the rigid element, flexible beams 120 and 122 and flexible member are bent and floating beam 110 is rotated. This provides a greater range of motion in the desired direction of motion than an embodiment fabricated with the flexible beams and flexible member straight and the floating beam not rotated.

The above-described pivot-less Watt linkages according to the invention have the additional advantage that their compliance in the direction of motion rapidly decreases as the extremes of the range of motion are approached. This provides a soft limit to the motion.

Figure 7:
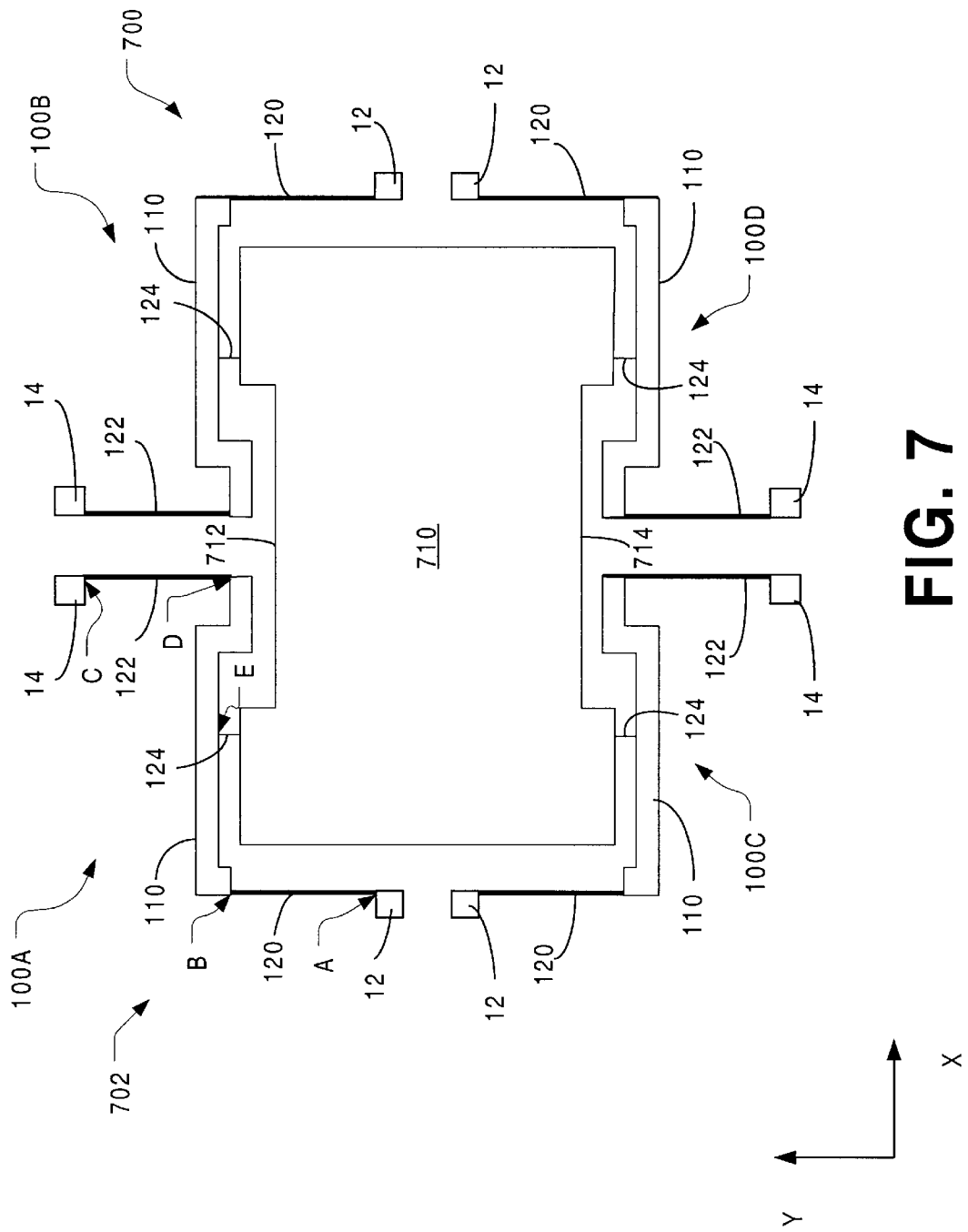
FIG. 7 is a plan view of a first embodiment of a micromachined device according to the invention incorporating a pivot-less Watt linkage-based suspension according to the invention.

FIG. 7 is a plan view of a first embodiment 700 of a micromachined device according to the invention. In micromachined device 700, four pivot-less Watt linkages 100A, 100B, 100C and 100D, each similar to pivot-less Watt linkage 100 described above with reference to FIG. 1A, collectively constitute pivot-less Watt linkage-based suspension 702. The pivot-less Watt linkage-based suspension supports a second rigid element composed of stage 710 relative to a first rigid element. The pivot-less Watt linkage-based suspension permits the stage to move freely relative to the first rigid element in a direction of motion indicated as the x-direction, and additionally resists motion of the stage in the y- and z-directions, orthogonal to the direction of motion. The pivot-less Watt linkage-based suspension packs closely around the stage 710, and thus provides the micromachined device with a high packing efficiency. Elements of the pivot-less Watt linkages that constitute the pivot-less Watt linkage-based suspension of the micromachined device 700 and that correspond to elements of the pivot-less Watt linkage 100 described above with reference to FIG. 1A are indicated using the same reference numerals and will not be described again here.

Stage 710 is substantially rectangular and may, for example, support a drive actuator, such as a bank of comb drives, an electrostatic surface actuator or a bank of scratch drive actuators. Additionally or alternatively, stage 710 may include a layer of magnetic material that forms part of a magnetic actuator.

Micromachined device 700 is composed of pivot-less Watt linkage-based suspension 702 and stage 710. Pivot-less Watt linkage-based suspension 702 is composed of the four pivot-less Watt linkages 100A, 100B, 100C and 100D. Pivot-less Watt linkages 100A and 100B are located side-by-side on side 712 of stage 710 with their floating beams 110 disposed in the x-direction. Pivot-less Watt linkages 100C and 100D are located side-by-side on side 714 of stage 710 with their floating beams 110 disposed in the x-direction. Side 714 is opposite side 712. In each of the pivot-less Watt linkages, flexible member 124 of extends from point E on floating beam 110 to stage 710.

Pivot-less Watt linkage-based suspension 702 allows stage 710 to move freely in the x-direction but resists motion of the stage in the y- and z-directions, orthogonal to the direction of motion. Additionally, the pivot-less Watt linkage-based suspension resists rotation of the stage about all three axes, i.e., roll about the x-axis, pitch about the y-axis and yaw about the z-axis.

Pivot-less Watt linkage-based suspension 702 resists rotation of stage 710 most effectively when the flexible beams 120 and 122 of all of the pivot-less Watt linkages 100A–100D remain under tension over the full range of motion of stage 710 in the x-direction. Tension can be maintained on the flexible beams over the full range of motion of stage 710 by making the flexible beams 122 slightly shorter than the flexible beams 120. Alternatively, tension can be maintained on the flexible beams by locating point E slightly closer to point D than to point B on each floating beam 110.

Micromachined device 700 may be made using the process described above with reference to FIGS. 1C and 1D, or another suitable process.

In micromachined device 700, the first rigid element includes structure (not shown) that links fixed supports 12 and 14 of the pivot-less Watt linkages 100A–100D. This structure is rigid in the directions in which flexible beams 120 and 122 of the pivot-less Watt linkages apply force to the respective fixed supports. Thus, the first rigid element maintains the relative positions of points A and C of and among the pivot-less Watt linkages notwithstanding forces applied to it by the flexible beams as stage 710 is displaced in the x-direction. A substrate to which the fixed supports are attached as described above with reference to FIG. 1D may provide the structure that links the fixed supports.

Micromachined device 700 may alternatively include a perimeter frame that links points A and C of and among the pivot-less Watt linkages 100A–100D in a manner similar to that described above with reference to FIGS. 3A–3D. Thus, micromachined device 700 may alternatively be fabricated as a single-layer device as described above with reference to FIG. 3D.

Figure 8:
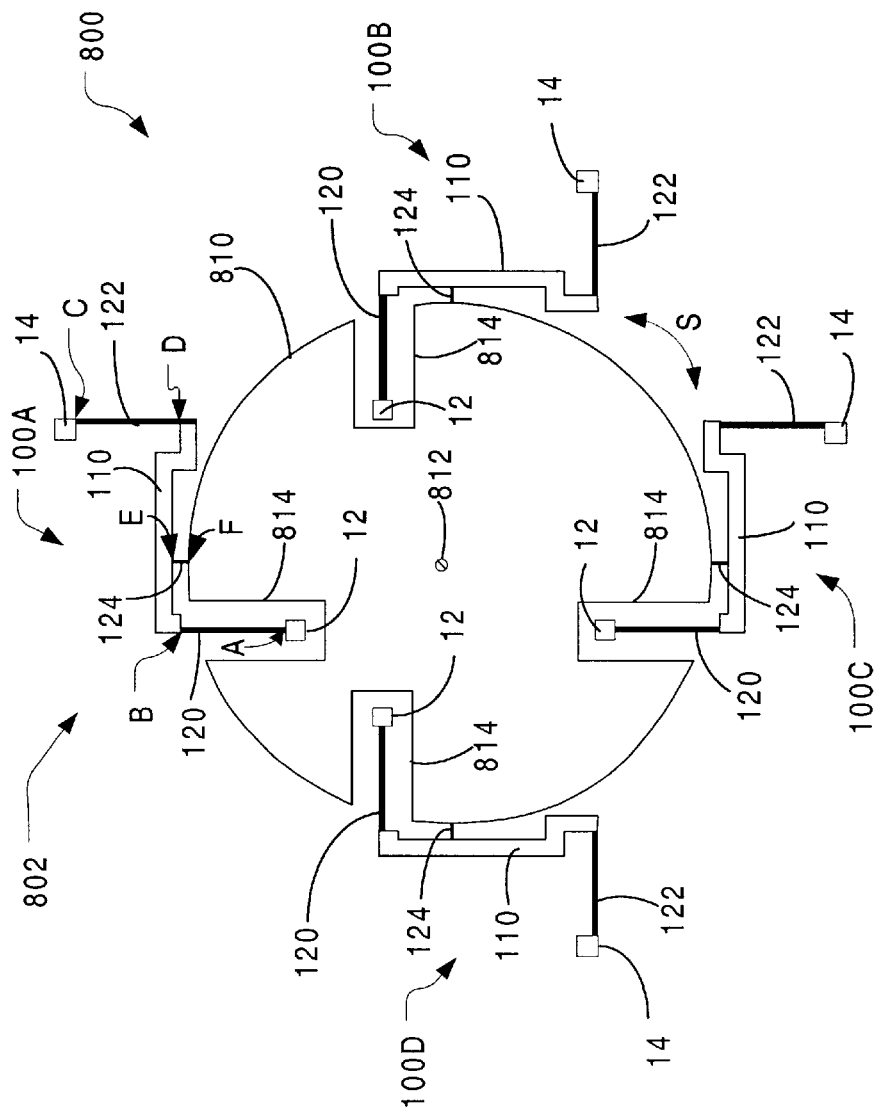
FIG. 8 is a plan view of a second embodiment of a micromachined device according to the invention incorporation a pivot-less Watt linkage-based suspension according to the invention.

FIG. 8 is a plan view of a second embodiment 800 of a micromachined device according to the invention. In micromachined device 800, four pivot-less Watt linkages 100A, 100B, 100C and 100D, each similar to pivot-less Watt linkage 100 described above with reference to FIG. 1A, collectively constitute pivot-less Watt linkage-based suspension 802. The pivot-less Watt linkage-based suspension supports a second rigid element composed of circular stage 810 relative to a first rigid element. The pivot-less Watt linkage-based suspension permits the stage to rotate freely about its center 812 and resists motion of the stage in the radial direction and in the z-direction, orthogonal to the direction of motion. The pivot-less Watt linkage-based suspension packs closely around the stage 810, and thus provides the micromachined device with a high packing efficiency. Elements of the pivot-less Watt linkages that form part of the micromachined device 800 and that correspond to elements of the pivot-less Watt linkage 100 are indicated using the same reference numerals and will not be described again here.

Stage 810 may support a drive actuator (not shown) configured to impart rotational motion on the stage. The stage is shaped to define the four slots 814 each of which accommodates the flexible beam 120 of one of the pivot-less Watt linkages 100A–100D and fixed support 12 of the first rigid element.

Micromachined device 800 is composed of pivot-less Watt linkage-based suspension 802 and stage 810. The pivot-less Watt linkage-based suspension is composed of the four pivot-less Watt linkages 100A, 100B, 100C and 100D. The pivot-less Watt linkages are disposed around the circumference of stage 810 at 90-degree intervals. In each of the pivot-less Watt linkages, flexible member 124 extends from point E on floating beam 110 to point F on stage 810.

In the example shown, the radius of curvature of the path followed by each point F at which flexible member 124 connects to stage 810 is determined by the offset along the length of floating beam 110 of point E from the mid-point between points B and D. Point E is the point at which the flexible member connects to the floating beam. The radius of curvature is related to the offset Δx, the distance $L_1$ between points B and D and the length L of flexible beams 120 and 122, respectively, by equation (4) set forth above. Alternatively, the radius of curvature of the path followed by each point F may be set by making the length $L_2$ of flexible beams 120 different from the length $L_3$ of flexible beams 122. The radius of curvature can be calculated using:

$$R_E \approx \frac{1.67 L_1 L_2 L_3}{L_1(L_2 - L_3) + 2\Delta x(L_2 + L_3)} \quad (5).$$

Regardless of how the curved path is obtained, pivot-less Watt linkages 100A–100D are structured to make the radius of curvature of the path substantially equal to the radius of stage 810. This causes the stage to rotate about its center 812.

In micromachined device 800, the first rigid element includes structure (not shown) that links fixed supports 12 and 14 of the pivot-less Watt linkages 100A–100D. This structure is rigid in the directions in which flexible beams 120 and 122 of the pivot-less Watt linkages apply force to the respective fixed supports 12 and 14. Thus, the first rigid element maintains the relative positions of points A and C of and among the pivot-less Watt linkages notwithstanding forces applied to it by the flexible elements as stage 810 rotates. A substrate to which the fixed supports are attached as described above with reference to FIG. 1D may provide the structure that links the fixed supports.

In a practical example of micromachined device 800, stage 810 had a radius of 250 μm, flexible beams 120 and 122 each had a length of 100 μm and floating beam 110 had a length of 200 μm. Locating each point E with an offset of 33 μm towards point B from the mid-point between points B and D along floating beam 110 caused each point F to move along curved path having a radius of 250 μm.

Micromachined device 800 may be made using the process described above with reference to FIGS. 1C and 1D, or another suitable process.

Micromachined device 800 may incorporate a pivot-less Watt linkage-based suspension composed of more or fewer than the number of pivot-less Watt linkages shown.

Figure 9:
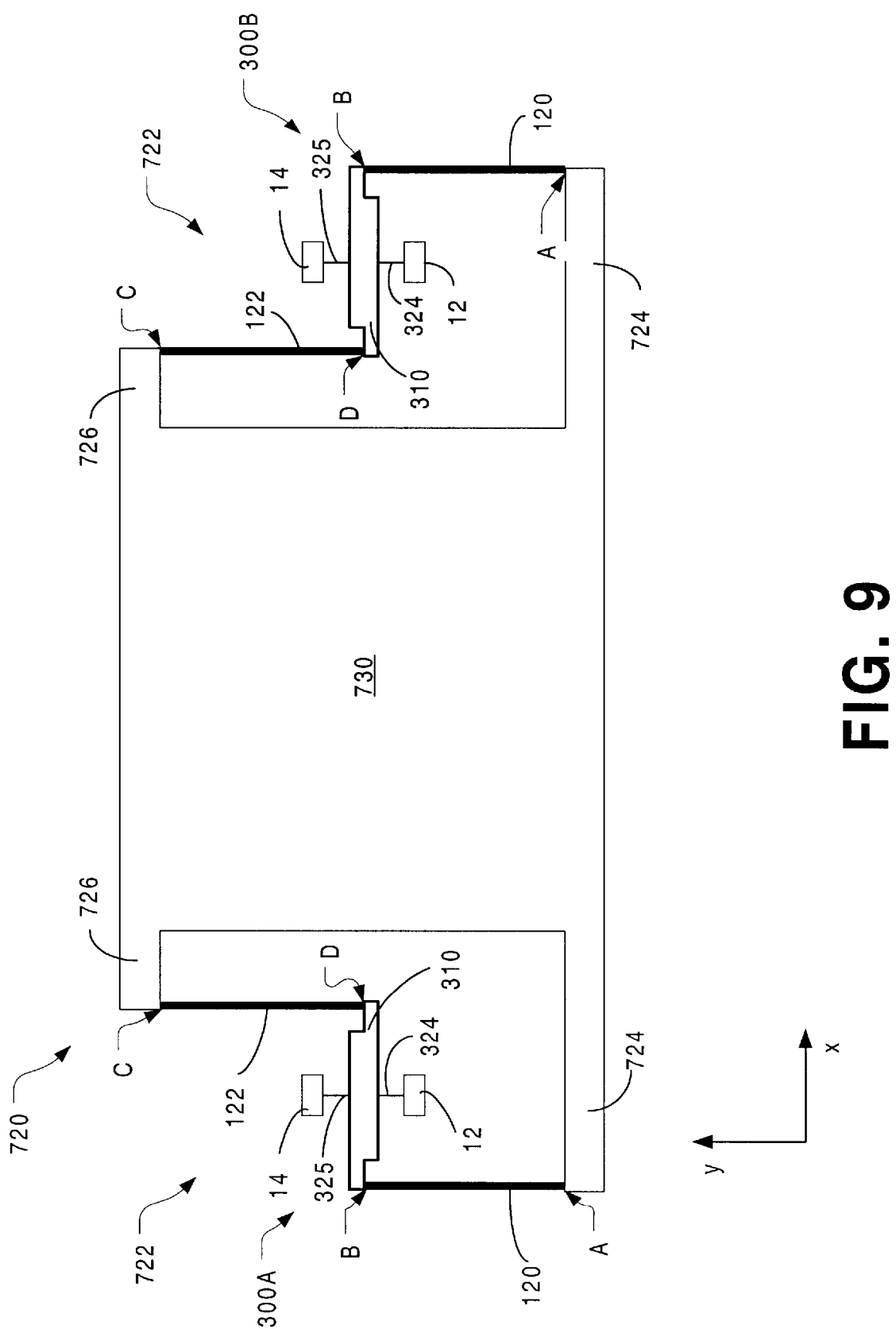
FIG. 9 is a plan view of a third embodiment of a micromachined device according to the invention incorporating a pivot-less Watt linkage-based suspension according to the invention.

FIG. 9 is a plan view of a third embodiment 720 of a micromachined device according to the invention. In micromachined device 720, two pivot-less Watt linkages 300A and 300B, each similar to pivot-less Watt linkage 300 described above with reference to FIG. 4, collectively constitute pivot-less Watt linkage-based suspension 722. The pivot-less Watt linkage-based suspension supports a first rigid element that includes rectangular stage 730 relative to a second rigid element that includes the rigid supports 12 and 14. The pivot-less Watt linkage-based suspension permits the stage to move freely relative to the second rigid element in a direction of motion indicated as the x-direction and resists motion of the stage in the y- and z-directions, orthogonal to the direction of motion. Pivot-less Watt linkage-based suspension 722 packs closely around stage 730, and thus provides the micromachined device with a high packing efficiency. Elements of the pivot-less Watt linkages that form part of the micromachined device 720 and that correspond to elements of pivot-less Watt linkage 300 are indicated using the same reference numerals and will not be described again here.

The first rigid element is composed of substantially rectangular stage 730 and two pair of extensions 724 and 726. In each pair, extensions 724 and 726 project in the x-direction from adjacent corners of stage 730 in the y-direction. Stage 730 may, for example, support a drive actuator, such as a bank of comb drives, an electrostatic surface actuator or a bank of scratch drive actuators. Additionally or alternatively, stage 730 may include a layer of magnetic material that forms part of a magnetic actuator.

Pivot-less Watt linkages 300A and 300B are located on opposite sides, in the x-direction, of stage 730 with their floating beams 310 disposed in the x-direction. In each of the pivot-less Watt linkages, flexible beam 120 extends in the −y-direction from point B on floating beam 310 to point A on extension 724, and flexible beam 122 extends in the +y-direction from point D on floating beam 310 to point C on extension 726. Extension 726 is shorter than extension 724 so that the points A and C are offset from one another in the x-direction.

Flexible beams 324 and 325 of the pivot-less Watt linkages 300A and 300B extend to fixed supports 12 and 14, which are part of the second rigid element. The second rigid element additionally includes structure (not shown) that links fixed supports 12 and 14 of the pivot-less Watt linkages 300A and 300B. This structure is rigid in the directions in which flexible beams 120 and 122 apply force to the respective fixed supports. Thus, the second rigid element maintains the relative positions of points F and K of each of pivot-less Watt linkages 300A and 300B and between the pivot-less Watt linkages notwithstanding forces applied to it by the flexible members as stage 730 is displaced in the x-direction. A substrate to which the fixed supports are attached as described above with reference to FIG. 1D may provide the structure that links the fixed supports.

Pivot-less Watt linkage-based suspension 722 allows stage 730 to move freely in the x-direction but resists motion of the stage in the y- and z-directions, orthogonal to the direction of motion. Additionally, the pivot-less Watt linkage-based suspension resists rotation of the stage about all three axes, i.e., roll about the x-axis, pitch about the y-axis and yaw about the z-axis.

In the example shown, pivot-less Watt linkage 300B is a mirror image of pivot-less Watt linkage 300A in the y–z plane. However, this is not critical to the invention. Pivot-less Watt linkages 300A and 300B may be identical to one another. To accommodate identical pivot-less Watt linkages, extensions 724 are made unequal in length and extensions 726 are made unequal in length.

Micromachined device 720 may be made using the process described above with reference to FIGS. 1C and 1D, or another suitable process.

FIG. 10 is a plan view of a fourth embodiment 740 of a micromachined device according to the invention. In micromachined device 740, two pivot-less Watt linkages 400A and 400B, each similar to pivot-less Watt linkage 400 described above with reference to FIG. 5, constitute pivot-less Watt linkage-based suspension 742. The pivot-less Watt linkage-based suspension supports a first rigid element that includes substantially rectangular stage 750 relative to a second rigid element that includes rigid supports 12, 14 and 16. The pivot-less Watt linkage-based suspension permits the stage to move freely relative to the second rigid element in a direction of motion indicated as the x-direction, and resists motion of the stage in the y- and z-directions, orthogonal to the direction of motion. Elements of the pivot-less Watt linkages that form part of the micromachined device 740 and that correspond to elements of the pivot-less Watt linkage 400 are indicated using the same reference numerals and will not be described again here.

Pivot-less Watt linkage-based suspension 742 packs closely around the stage 750, and thus provides the micromachined device with a high packing efficiency. Moreover, the flexible beams of pivot-less Watt linkage-based suspension 742 are substantially longer than those of the pivot-less Watt linkage-based suspensions described above for a given dimension of the micromachined device in the y-direction.

The first rigid element is composed of substantially rectangular stage 750 and two pair of extensions 744 and 746. In each pair, extensions 744 and 746 project in the x-direction from adjacent corners of stage 750 in the y-direction. Stage 750 may, for example, support a drive actuator, such as a bank of comb drives, an electrostatic surface actuator or a bank of scratch drive actuators. Additionally or alternatively, stage 750 may include a layer of magnetic material that forms part of a magnetic actuator.

Pivot-less Watt linkages 400A and 400B are located on opposite sides, in the x-direction, of stage 750 with the rigid beam sections 412 and 414 constituting their compound floating beams 410 disposed in the x-direction. In each of the pivot-less Watt linkages, flexible beam 120 extends in the −y-direction from point B on rigid beam section 414 to point A on extension 744, and flexible beam 122 extends in the +y-direction from point D on rigid beam section 412 to point C on extension 746. Extension 746 is shorter than extension 744 so that points A and C are offset from one another in the x-direction Pivot-less Watt linkage-based suspension 742 allows stage 750 to move freely in the x-direction but resists motion of the stage in the y- and z-directions, orthogonal to the direction of motion. Additionally, the pivot-less Watt linkage-based suspension resists rotation of the stage about all three axes, i.e., roll about the x-axis, pitch about the y-axis and yaw about the z-axis.

In the example shown, pivot-less Watt linkage 400B is a mirror image of pivot-less Watt linkage 400A in the y–z plane. However, this is not critical to the invention. Pivot-less Watt linkages 400A and 400B may be identical to one another. To accommodate identical pivot-less Watt linkages, extensions 744 are made unequal in length and extensions 746 are made unequal in length.

Micromachined device 740 may be made using the process described above with reference to FIGS. 1C and 1D, or another suitable process.

The invention has been described with reference to examples of pivot-less Watt linkages, pivot-less Watt linkage-based suspensions and micromachined devices that are unitary structures fabricated in a device layer of silicon by micromachining. However, such unitary structure may be formed photolithographically in a device layer of a suitable photosensitive plastic material, such as photoresist. As a further alternative, such unitary structure may be formed by molding a suitable plastic material or stamping a suitable metal or plastic material.

As an alternative to forming the pivot-less Watt linkages, pivot-less Watt linkage-based suspensions and micromachined devices according to the invention as unitary structures by micromachining, as described above, the pivot-less Watt linkage, pivot-less Watt linkage-based suspensions and micromachined devices 100 may be fabricated by assembling piece parts. For example, the pivot-less Watt linkage 100 shown in FIG. 1A may be fabricated by assembling piece parts constituting floating beam 110, flexible beams 120 and 122 and flexible member 124 to form the pivot-less Watt linkage. When such piece parts are assembled, the flexible beams and the flexible member are each non-pivotally attached to the floating beam. A pivot-less Watt linkage-based suspension may be formed by non-pivotally attaching the flexible member of at least two pivot-less Watt linkages to a second rigid element at spatially-separated locations, and by non-pivotally attaching the ends of the flexible beams remote from the floating beam of each of the pivot-less Watt linkages to a first rigid element. The ends of the flexible beams remote from the floating beam may be attached to the first rigid element via respective fixed supports, as described above.

This disclosure describes the invention in detail using illustrative embodiments. However, it is to be understood that the invention defined by the appended claims is not limited to the precise embodiments described.

We claim:

1. A pivot-less Watt linkage for supporting a first rigid element relative to a second rigid element to permit relative motion therebetween, the pivot-less Watt linkage comprising:
   an elongate, rigid, floating beam;
   an elongate first flexible beam extending in a first direction from a first point on said floating beam to the first rigid element;
   an elongate second flexible beam extending in a second direction, substantially opposite said first direction, from a second point on said floating beam to said first rigid element, said second point being spatially separated from said first point along the length of said floating beam; and
   a flexible member extending in said first direction from a third point on said floating beam to the second rigid element, said third point being intermediate between said first point and said second point.

2. The pivot-less Watt linkage of claim 1, in which a line interconnecting the ends of said flexible beams remote from said floating beam intersects said floating beam.

3. The pivot-less Watt linkage of claim 2, in which said line has a length greater than the sum of the length of said first flexible beam and the length of said second flexible beam.

4. The pivot-less Watt linkage of claim 1, in which said second flexible beam extends substantially anti-parallel to said first flexible beam.

5. The pivot-less Watt linkage of claim 4, in which said first direction and said second direction are each substantially orthogonal to said length of said floating beam.

6. The pivot-less Watt linkage of claim 1, in which:
   the motion is in a direction of motion; and
   said floating beam is substantially parallel to said direction of motion.

7. The pivot-less Watt linkage of claim 1, in which:
the motion is along a substantially straight path; and
said third point is substantially mid way between said first point and said second point.

8. The pivot-less Watt linkage of claim 1, in which:
the motion is along a curved path; and
said third point is offset along said length of said floating beam from mid way between said first point and said second point.

9. The pivot-less Watt linkage of claim 1, in which:
the motion is along a curved path; and
said flexible beams differ in length.

10. The pivot-less Watt linkage of claim 1, in which:
said flexible member is a first flexible member; and
said pivot-less Watt linkage additionally comprises a second flexible member extending in said second direction from a fourth point on said floating beam, opposite said third point, to said second rigid element.

11. The pivot-less Watt linkage of claim 10, in which said floating beam is shaped to locate said first and second points and a point mid-way between said third point and said fourth point on a straight line substantially orthogonal to the lengths of the flexible beams.

12. The pivot-less Watt linkage of claim 1, in which said floating beam includes:
a first rigid beam section in which the first and third points are located, said first rigid beam section being elongate;
a second rigid beam section in which the second point is located, said second rigid beam section being elongate;
a third flexible beam extending from a fifth point on said first rigid beam section to a sixth point on said second rigid beam section, said fifth point being at a greater distance along the length of said first rigid beam section from said first point than said third point, said sixth point being spatially separated from said second point along the length of said second rigid beam section; and
an additional flexible member extending parallel to said second rigid beam section from a seventh point on said second beam section, remote from said second point, to said second rigid element.

13. The pivot-less Watt linkage of claim 12, in which:
said first point is spatially separated from said third point along the length of said first rigid beam section by a distance a;
said third point is spatially separated from said fifth point along said length of said first rigid beam section by a distance b;
an eighth point, mid-way along the length of said additional flexible member is spatially separated from said second point along said length of said second rigid beam section by a distance c;
said sixth point is spatially separated from said eighth point along said length of said second rigid beam section by a distance d; and
the product of a and d is equal to the product of b and c.

14. The pivot-less Watt linkage of claim 13, in which:
said distance b is equal to said distance d; and
the sum of said distance a and said distance b is equal to the sum of said distance (c) and said distance (d).

15. The pivot-less Watt linkage of claim 12, in which:
each of said first and second flexible beams extends from said first rigid beam section and said second rigid beam section, respectively, to said first rigid element;
said flexible member is a first flexible member and extends from said first rigid beam section to said second rigid element; and
said pivot-less Watt linkage additionally comprises a second flexible member extending in said second direction from a fourth point on said first rigid beam section, opposite said third point, to said second rigid element.

16. The pivot-less Watt linkage of claim 15, in which:
said first rigid beam section is shaped to locate said first and fifth points and a point half-way between said third and fourth points on a straight line substantially orthogonal to the lengths of the flexible beams; and
said second rigid beam section is shaped to locate said second, sixth and seventh points on a straight line substantially orthogonal to the lengths of the flexible beams.

17. The pivot-less Watt linkage of claim 1, in which said floating beam is shaped to locate said first and second points and a mid-point half-way along the length of said flexible member on a straight line substantially orthogonal to the lengths of the flexible beams.

18. The pivot-less Watt linkage of claim 17, in which:
said floating beam includes, in tandem:
a first beam section in which said first point is located,
a third beam section in which said third point is located, and
a second beam section in which said second point is located; and
said first beam section and said second beam section are laterally offset relative to said third beam section by respective offset amounts that locate said first point, said second point, and said mid-point on said straight line.

19. The pivot-less Watt linkage of claim 1, in which said floating beam, said flexible beams and said flexible member are portions of a unitary structure.

20. The pivot-less Watt linkage of claim 19, in which at least one of said first rigid element and said second rigid element is additionally a portion of said unitary structure.

21. The pivot-less Watt linkage of claim 19, in which:
said pivot-less Watt linkage includes a major surface and has a cross-sectional shape in a plane parallel to said major surface; and
said cross-sectional shape is substantially independent of depth from said major surface.

22. The pivot-less Watt linkage of claim 19, additionally comprising a substrate to which at least part of said first rigid element or said second rigid element is attached.

23. The pivot-less Watt linkage of claim 19, in which said first rigid element includes a perimeter frame interconnecting the ends of the flexible beams remote from the floating beam.

24. The pivot-less Watt linkage of claim 19, in which the unitary structure constitutes part of a single device layer.

25. A pivot-less Watt linkage-based suspension for supporting a first rigid element relative to a second rigid element to permit relative motion therebetween, the suspension comprising pivot-less Watt linkages, each including:
an elongate, rigid, floating beam;
an elongate first flexible beam extending in a first direction from a first point on said floating beam to the first rigid element;
an elongate second flexible beam extending in a second direction, substantially opposite said first direction, from a second point on said floating beam to said first rigid element, said second point being spatially separated from said first point along the length of said floating beam; and a flexible member extending in said first direction from a third point on said floating beam to the second rigid element, said third point being intermediate between said first point and said second point.

26. A micromachined device, comprising:

a first rigid element;

a second rigid element; and a pivot-less Watt linkage-based suspension for supporting said first rigid element relative to said second rigid element to permit relative motion therebetween, said suspension including pivot-less Watt linkages, each comprising:

an elongate, rigid, floating beam, an elongate first flexible beam extending in a first direction from a first point on said floating beam to said first rigid element, an elongate second flexible beam extending in a second direction, substantially opposite said first direction, from a second point on said floating beam to said first rigid element, said second point being spatially separated from said first point along the length of said floating beam, and a flexible member extending in said first direction from a third point on said floating beam to said second rigid element.

* * * * *